(12) United States Patent
Paradise et al.

(10) Patent No.: US 12,530,910 B2
(45) Date of Patent: Jan. 20, 2026

(54) METHODS AND SYSTEMS FOR TRACKING BIOLOGICAL MATERIAL

(71) Applicant: CooperSurgical, Inc., Trumbull, CT (US)

(72) Inventors: Charles Paradise, Brooklyn, NY (US); Michael Gerbush, Trumbull, CT (US); Milan Ivosevic, Trumbull, CT (US); Brian Costello, Whitehouse Station, NJ (US); Paul DiCesare, Shelton, CT (US); Danial Ferreira, Shelton, CT (US); Ronald Green, Shelton, CT (US)

(73) Assignee: CooperSurgical, Inc., Trumbull, CT (US)

(*) Notice: Subject to any disclaimer, the term of this patent is extended or adjusted under 35 U.S.C. 154(b) by 321 days.

(21) Appl. No.: 18/218,666

(22) Filed: Jul. 6, 2023

(65) Prior Publication Data
US 2024/0331414 A1    Oct. 3, 2024

Related U.S. Application Data

(60) Provisional application No. 63/456,663, filed on Apr. 3, 2023.

(51) Int. Cl.
*G06V 20/69* (2022.01)
*G06T 7/40* (2017.01)
(Continued)

(52) U.S. Cl.
CPC ............... *G06V 20/69* (2022.01); *G06T 7/40* (2013.01); *G06V 10/764* (2022.01);
(Continued)

(58) Field of Classification Search
CPC .... G06V 20/69; G06V 10/764; G06V 10/774; G06V 2201/03; G06V 10/25;
(Continued)

(56) References Cited

U.S. PATENT DOCUMENTS 9,723,831 B2    8/2017  Sun et al.
10,047,331 B2   8/2018  Hansen et al.
(Continued)

FOREIGN PATENT DOCUMENTS

CN      112401994    2/2021
EP      2315823      3/2018
(Continued)

OTHER PUBLICATIONS

International Search Report and Written Opinion in International Appln. No. PCT/US2023/069677, mailed on Jan. 4, 2024, 12 pages.
(Continued)

*Primary Examiner* — Matthew C Bella
*Assistant Examiner* — Andrew B. Jones
(74) *Attorney, Agent, or Firm* — Fish & Richardson P.C.

(57) ABSTRACT

The present disclosure relates to a method performed by one or more computers for tracking a biological material of a subject during an in-vitro fertilization process. The method includes receiving, from a camera, an image of a dish having a visual characteristic and a drop disposed on the dish, the dish holding the biological material at a drop location. The method then includes processing the image of the dish, using a drop identification model, to identify the drop according to the visual characteristic. Further, the method includes assigning an identifier to the drop associated with the drop location, and recording the identifier of the drop associated with the drop location.

42 Claims, 17 Drawing Sheets

(51) Int. Cl.
  *G06V 10/764* (2022.01)
  *G06V 10/774* (2022.01)
  *G16B 20/10* (2019.01)
  *G16H 10/40* (2018.01)

(52) U.S. Cl.
  CPC ........... *G06V 10/774* (2022.01); *G16B 20/10* (2019.02); *G16H 10/40* (2018.01); *G06T 2207/10056* (2013.01); *G06T 2207/20081* (2013.01); *G06T 2207/30024* (2013.01); *G06V 2201/03* (2022.01)

(58) Field of Classification Search
  CPC ................. G06V 20/698; G06T 7/40; G06T 2207/10056; G06T 2207/20081; G06T 2207/30024; G16B 20/10; G16H 10/40
  See application file for complete search history.

(56) References Cited

U.S. PATENT DOCUMENTS

| | | | |
|---|---|---|---|
| 10,330,906 B2 | 6/2019 | Zheng | |
| 10,739,266 B2 | 8/2020 | Keller | |
| 10,809,275 B2 | 10/2020 | Hurwitz et al. | |
| 11,276,482 B2 | 3/2022 | Vom et al. | |
| 11,294,165 B2 * | 4/2022 | Deisseroth | H04N 23/69 |
| 11,465,140 B2 | 10/2022 | Briggs et al. | |
| 11,817,187 B2 | 11/2023 | Bixon et al. | |
| 2011/0250690 A1 * | 10/2011 | Craig | B01L 3/502753 |
| | | | 435/303.1 |
| 2014/0106389 A1 * | 4/2014 | Loewke | G02B 21/0088 |
| | | | 435/286.2 |
| 2015/0160117 A1 | 6/2015 | Wong et al. | |
| 2016/0029619 A1 * | 2/2016 | Sun | A01N 1/144 |
| | | | 435/287.3 |
| 2020/0372241 A1 | 11/2020 | Adalsteinsson et al. | |
| 2021/0214765 A1 * | 7/2021 | Deshpande | G06V 10/82 |
| 2022/0309705 A1 | 9/2022 | Kodandaramaiah et al. | |
| 2022/0358653 A1 | 11/2022 | Singh et al. | |
| 2023/0303959 A1 | 9/2023 | Blanchard | |

FOREIGN PATENT DOCUMENTS

| | | |
|---|---|---|
| JP | 2012039931 | 3/2012 |
| WO | WO 2019/227126 | 12/2019 |

OTHER PUBLICATIONS

International Preliminary Report on Patentability in International Appln. No. PCT/US2023/069677, mailed on Jun. 6, 2025, 8 pages.

* cited by examiner

METHODS AND SYSTEMS FOR TRACKING BIOLOGICAL MATERIAL

CROSS REFERENCE TO RELATED APPLICATION

This application claims priority to U.S. Provisional Patent Application No. 63/456,663, filed on Apr. 3, 2023, pursuant to 35 USC § 119. The content of this provisional application is incorporated herein by reference in its entirety.

TECHNICAL FIELD

The present disclosure relates to methods and systems for tracking a biological material, and more specifically, methods and systems for tracking biological material in an in-vitro fertilization process.

BACKGROUND

When conducting an in-vitro fertilization (IVF) cycle, standard practice is to create multiple embryos and transfer the embryo that has the best chance of developing into a healthy baby back into the uterus. Embryos that are aneuploid (i.e., having an uneven number of chromosomes) are less likely to make it to birth, so genomic testing of embryos, which can identify aneuploid embryos, has become a common practice.

To carry out genomic testing, cells are removed from the embryo and sent to a genomics lab for testing, and the embryo is vitrified (i.e., frozen in liquid nitrogen) while awaiting results. After receiving the results, the embryo associated with the biopsy will be thawed and transferred if viable or discarded if not viable.

It is essential that accurate records are kept so that the genomic tests results can be linked back to the embryo (now vitrified) that the biopsy sample came from. To maintain this link, the embryo is assigned an identity either prior to or at a biopsy stage. During biopsy, the biopsy sample also assumes this identity. The identity is typically a sequential number, which when linked with the patient's ID becomes a unique identifier.

The biopsy process happens in a drop of fluid on a dish. After the biopsy has happened, the embryo will often be moved into a drop on another dish, and from there through other drops (some on the same dish, some on other dishes) until the embryo is vitrified. A similar process happens with the biopsy sample. The dishes are labelled with the patient ID, and most drops are labelled with the identity number of the embryo. There may be multiple drops in a single dish.

To prevent mistakes, every time an embryo is moved between dishes, it is best practice for a second embryologist to be called over to witness the movement. The witness ensures that the two dishes have the same patient information, the correct embryo is being selected to be moved, and that it is placed in the correct drop in the receiving dish. Often, the embryologist and witness will each initial a paper record to show that this has happened.

SUMMARY

The present disclosure is directed to systems and methods for tracking a subject's biological material in a lab during an IVF process. The systems disclosed herein provide seamless and automated tracking that reduces instances of error and the need for a witness at each transfer step (i.e., moving a biological sample between different dishes or vessels or between different drops on the same dish).

In a first example aspect, a method performed by one or more computers for tracking a biological material of a subject during an in-vitro fertilization process may include receiving, from a camera, an image of a dish having a visual characteristic and a drop disposed on the dish, the dish holding the biological material at a drop location. The method may include processing the image of the dish, using a drop identification model, to identify the drop according to the visual characteristic. Further, the method may include assigning an identifier to the drop associated with the drop location, and recording the identifier of the drop associated with the drop location.

In a second example aspect, one or more non-transitory computer storage media may store instructions that when executed by one or more computers cause the one or more computers to perform operations for tracking a biological material in an in-vitro fertilization (IVF) process. The operations may include receiving an image of a dish, wherein the dish comprises a visual characteristic and one or more drops. The operations may further include processing the image of the dish, using a drop identification model, to identify a drop associated with a drop location according to the visual characteristic. The operations may further include assigning an identifier to the drop based on the visual characteristic and recording the identifier of the drop associated with the drop location.

In a third example aspect, a system for tracking a biological material in an in-vitro fertilization (IVF) process may include a microscope, a camera, one or more computers, and one or more storage devices communicatively coupled to the one or more computers. The one or more storage devices may store a database containing a plurality of visual characteristics, and instructions that, when executed by the one or more computers, cause the one or more computers to perform operations for tracking a biological material in an in-vitro fertilization process. The operations may include receiving an image of a dish, wherein the dish comprises a visual characteristic and one or more drops. The operations may further include processing the image of the dish to identify a drop at a drop location according to the visual characteristic and/or the one or more drops. Further, the operations may further include assigning an identifier to the drop associated with the drop location and recording the identifier of the drop associated with the drop location.

In accordance with any one of the first, second, and third aspects, the method, system, and non-transitory computer storage media for tracking a biological material of a subject during an in-vitro fertilization process and may include any one of the following forms.

In one example, receiving may include receiving a partial or entire layout image of the dish using a microscope camera.

In another example, receiving may include receiving an entire layout of the dish using a wide-view camera.

In some examples, the method may include identifying a first status or condition of a pipette at the drop location.

In some examples, the pipette may receive the biological material at the drop location.

In some examples, the method may include recording in a memory the first status or condition of the pipette holding the biological material.

In other examples, identifying the first status or condition may include determining that the pipette enters a first drop holding the biological material.

In yet another example, the method may include identifying a second status or condition of the pipette holding the biological material at a second location.

In one form, the method may include analyzing the second status or condition of the pipette.

In another form, the method may include determining, before the biological material is delivered to the second location, that the second location for depositing the biological material correlates with a standard operating protocols stored in a database of the memory.

In some forms, the method may include signaling an error message after determining that the second location does not correlate with standard operating protocols.

In other forms, the method may include signaling a correct message after determining that the second location correlates with standard operating protocols.

In yet another form, the method may include recording a delivery status of the biological material from the pipette to the second location.

In some forms, the second location may be a tube having a unique identity.

In one aspect, the method may include recording a delivery status of the biological material from the pipette to the second location.

In some aspects, the second location may be a drop of washing solution.

In another aspect, the method may include recording a delivery status of the biological material from the pipette to the second location.

In some aspects, the second location may be a drop on a second dish.

In some aspects, the method may include identifying a third status or condition of the pipette holding the biological material at a third location.

In other aspects, the method may include assigning the biological material a unique identity.

In some aspects, the unique identity of the biological material may be maintained as the biological material moves.

In yet another aspect, identifying the biological material may include identifying that the biological material is an embryo associated with the drop location.

In one example, identifying the biological material may include identifying that the biological material is a biopsy of an embryo associated with the drop location.

In another example, the method may include processing the image of the dish, using a subject identification model, to classify a subject identification associated with the dish.

In some examples, the method may include recording in the memory the subject identification associated with the dish.

In some examples, the method may include processing the image of the dish having a drop pattern, using a drop pattern identification model, to classify a type of dish associated with the drop pattern.

In other examples, the method may include obtaining, from a database, a pattern of drops on the dish.

In some examples, the method may include processing a model input that comprises the pattern of drops on the dish using a machine learning model, having a set of machine learning model parameters, to generate a model output that characterizes a likelihood that the pattern of drops on the dish is associated with a type of dish.

In some examples, the method may include classifying, based on the model output of the machine learning model, whether the pattern of drops is associated with the type of dish.

In yet another example, the method may include training the machine learning model, by a machine learning training technique, to determine trained values of the set of machine learning model parameters.

In one form, training the machine learning model by the machine learning training technique may include obtaining a set of training examples.

In some forms, each training example may include (i) a training input comprising a pattern of drops on a dish, and (ii) a target output based on whether the pattern of drops designates the type of dish.

In some forms, training the machine learning model may include training the machine learning model on the set of training examples.

In another form, training the machine learning model on the set of training examples may include training the machine learning model to, for each training example, process the training input of the training example to generate a model output that matches the target output of the training example.

In some forms, the operations may include receiving an image of a pipette adjacent to or in the drop.

In some forms, the operations may include identifying a status or condition of the pipette as receiving a biological material associated with the drop.

In other forms, the operations may include receiving an image of a second dish having a visual characteristic and one or more drops.

In some forms, the operations may include identifying the second dish according to the visual characteristic.

In some forms, the operations may include processing the image of the second dish, using a drop identification model, to identify a drop associated with a drop location of the second dish according to the visual characteristic.

In some forms, the operations may include assigning an identifier to the drop based on the visual characteristic.

In some forms, the operations may include recording the identifier of the drop associated with the drop location of the second dish.

In yet another form, a database may include information related to a plurality of dish types and a plurality of drop patterns for each of the plurality of the types of dishes.

In some forms, the operations may include receiving an image of a dish having a drop pattern.

In some forms, the operations may include comparing the drop pattern to the plurality of drop patterns associated with the plurality of types of dishes stored in the database.

In some forms, the operations may include identifying a dish type of the dish according to the drop pattern.

In one aspect, the operations may include receiving an image of a pipette adjacent to or in a different drop at a drop location of a second dish.

In another aspect, the operations may include identifying a status or condition of the pipette before delivering the biological material associated with the drop location of the dish to the drop location of the second dish.

In some aspects, the operations may include receiving an image of the pipette adjacent to or in a second drop of the dish.

In other aspects, the operations may include identifying a status or condition of the pipette before delivering the biological material associated with the drop location to the second drop of the dish.

In yet another aspect, the operations may include receiving an image of the pipette adjacent to or in a tube.

In one example, the operations may include identifying a status or condition of the pipette before delivering the biological material associated with the drop location to the tube.

In another example, the operations may include, before delivering the biological material, determining that the status or condition of the pipette correlates with a correct drop location according to standard operating protocols stored in a database.

In some examples, the operations may include receiving an image of the pipette entering a drop located at the drop location.

In other examples, the operations may include identifying a status or condition of the pipette entering the drop as receiving the biological material associated with the drop location.

In yet another example, the operations may include receiving an image of the pipette entering a different drop located at a different drop location.

In one form, the operations may include identifying a status or condition of the pipette entering the different drop as delivering the biological material associated with the drop location to the second drop location.

In another form, the operations may include processing the image of the dish, using a dish identification model, to classify a dish orientation or dish type according to the visual characteristic.

In some forms, the operations may include assigning the biological material a unique identity.

In some forms, the unique identity of the biological material may be maintained as the biological material moves.

In some aspects, the camera may be a wide-view camera configured to image an entire layout of the dish.

In other aspects, the system may include a microscope camera.

In yet another aspect, the camera may be a microscope camera.

In one example, the system may include a wide-view camera configured to image an entire layout of the dish.

In another example, the database may contain information related to a plurality of dish types and a plurality of drop patterns for each of the plurality of the types of dishes.

In some examples, the operations may include receiving an image of a pipette adjacent to or in a drop of a second dish.

In other examples, the operations may include identifying a status or condition of the pipette before delivering the biological material associated with the drop location of the dish to the drop of the second dish.

In yet another example, the operations may include delivering a correct message after determining the status or condition of the pipette correlates with the correct drop location.

In one form, the operations may include delivering an error message after determining the status or condition of the pipette does not correlate with the correct drop location.

Systems and methods described in the present disclosure can include one or more of the following advantages.

In some examples, the system is compatible with multiple dish types (i.e., flat dishes or welled dishes) having various drop layouts, so every step of an IVF cycle can be recorded, thereby eliminating the need for a second witness. Additionally, the system is compatible with other labware used in the IVF cycle, such as, for example, PCR tubes, pipettes, vitrification devices, test tubes, and transfer catheters. By eliminating the need of a second witness, the tracking system and method disclosed herein can reduce costs associated with IVF, and streamline the IVF process.

In some examples, the system can be arranged to constantly witness the actions of a technician (e.g., embryologist), so drops cannot be moved without the system recording the movements. The system sees the embryo being moved, so the movement is truly witnessed.

In some examples, the system provides real-time feedback to the embryologist and thereby prevents errors from occurring. Specifically, the system can incorporate a clinic's standard operating protocols (SOPs), and the actions of the embryologist can be compared against the SOP. For example, while the embryologist is looking through the microscope, and it appears that an embryo will be placed in the wrong drop, the system will notify the embryologist before an incorrect transfer happens.

In some examples, the system improves the workplace environment. Specifically, the system reduces scanning equipment, RFID tag or barcode printers, etc., thereby by avoiding clutter. Additionally, by using one or more cameras with varying fields of view, the visibility of the workspace may improve. While using a microscopic view, the embryologist can work on any drop they can see, and while using a wide-view camera, the embryologist can find the next drop to work on seamlessly.

In some examples, the system may be incorporated easily into existing work spaces, and may be retrofitted to work with existing microscopes. Further, in some examples, the system can be used for tracking other biological materials in an IVF process or other process.

Definitions

As used herein, the terms "top," "bottom," "upper," "lower," "above," and "below" are used to provide a relative relationship between structures. The use of these terms does not indicate or require that a particular structure must be located at a particular location in the apparatus.

Some examples may be described using the expression "coupled" and "connected" along with their derivatives. For example, some arrangements may be described using the term "coupled" to indicate that two or more elements are in direct physical or electrical contact. The term "coupled," however, may also mean that two or more elements are not in direct contact with each other, but yet still co-operate or interact with each other. The examples described herein are not limited in this context.

Other aspects, features, and advantages of the present disclosure will be apparent from the following detailed description, figures, and claims.

DETAILED DESCRIPTION

Figure 1A:
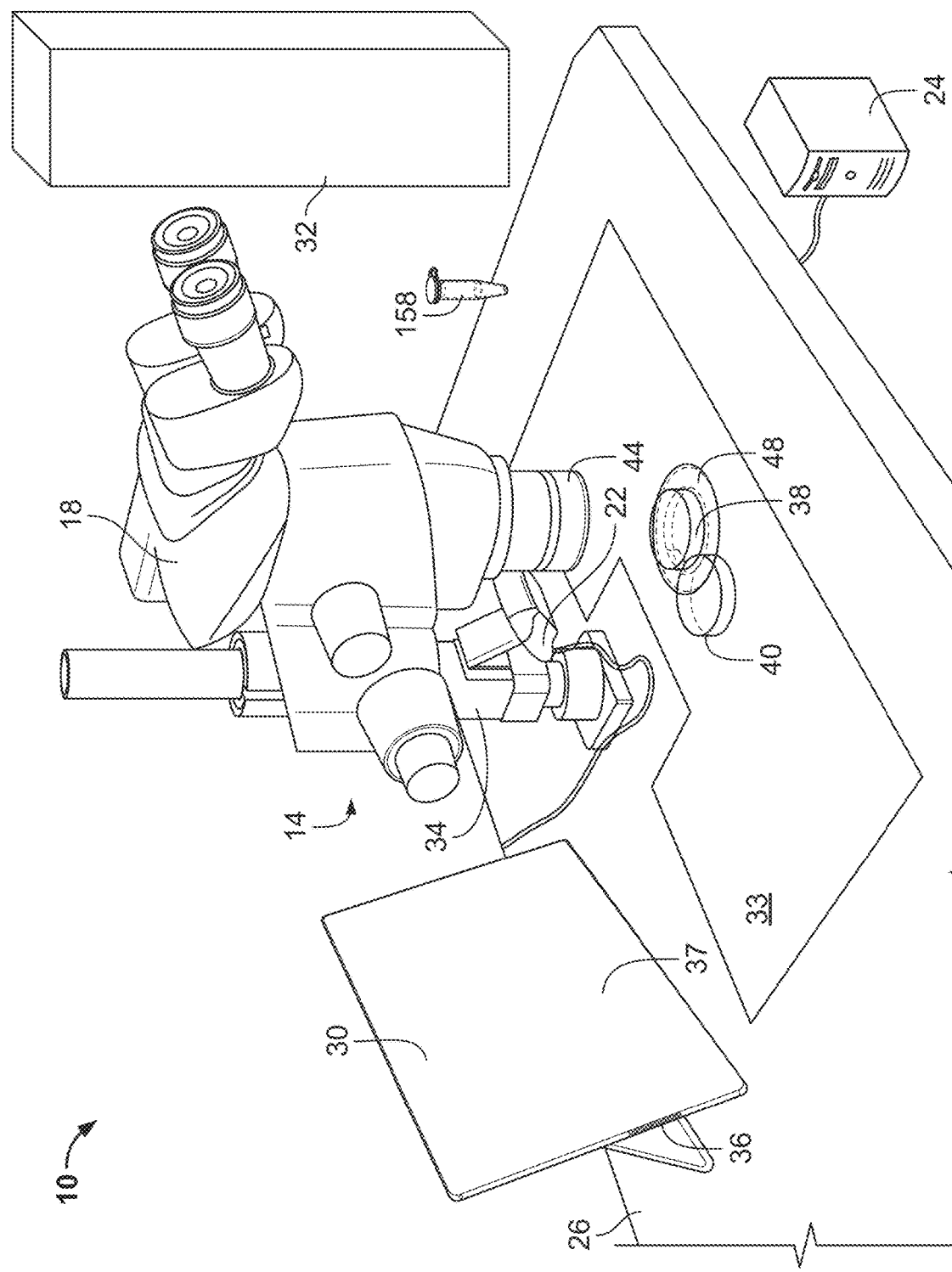
FIG. 1A is a schematic diagram of a workbench assembly for tracking a biological material in an in-vitro fertilization process in accordance with the teachings of the present disclosure.

A tracking assembly disclosed herein provides a seamless and automated chain of custody of biological material within an IVF lab that reduces instances of error and the need for an additional embryologist to witness each transfer step (i.e., moving a biological sample between different dishes or vessels or between different drops on the same dish) of an IVF cycle. In FIG. 1A, an assembly 10 for tracking a subject's biological material in a lab during an IVF process includes an imaging system 14 including a camera 22 that is coupled to a microscope 18 and coupled to a computer 24. The microscope 18 and camera 22 are arranged on a work surface 26, and the computer 24 is disposed underneath or beside the work surface 26. The camera 22 is coupled to the computer 24, and may be coupled to a user interface 30. The imaging system 14 is configured to monitor and record any transfer of biological material on the work surface 26. Adjacent or near the assembly 10 is a cryopreservation device 32 that stores biological material. In the illustrated example, an RFID reader 33 is integrated with the work surface 26 to read RFID tags associated with various dishes that are placed on the RFID reader 33. The RFID tags may be configured to identify the subject.

Figure 1B:
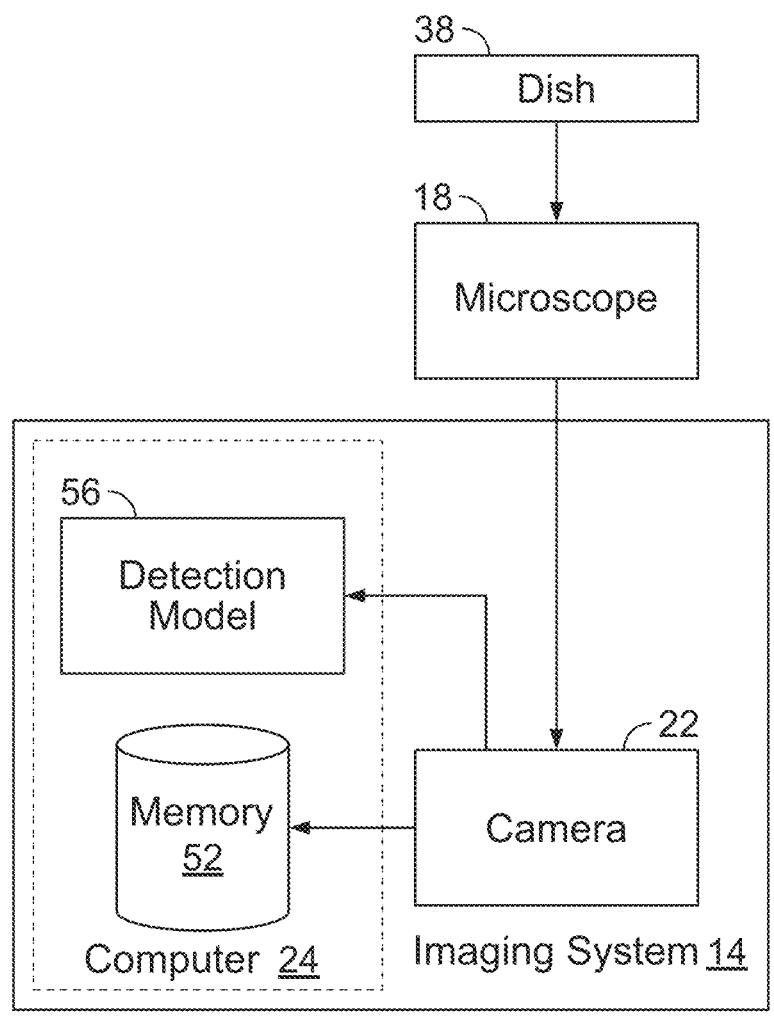
FIG. 1B is a block diagram of an example imaging system of the assembly of FIG. 1A.

FIG. 1B shows a block diagram of the example imaging system 14 of FIG. 1A. The imaging system 14 is an example of a system implemented as computer programs on one or more computers in one or more locations in which the systems, components, and techniques described below are implemented. Generally, the imaging system 14 includes one or more processors and data storage or memory devices that define a detection model and stores instructions executed by the one or more processors. More specifically, the imaging system 14 uses image recognition software (e.g., computer vision, machine vision, etc.) and/or machine learning to image, process, and identify drops, visual characteristics, dishes, vessels, and pipettes brought under the microscope 18. The imaging system 14 tracks and keeps records of biological material as an embryologist moves the biological material between different locations including different drops, dishes, vessels, and pipettes. In the illustrated example of FIG. 1B, the imaging system 14 includes the computer 24, the camera 22, a memory 52, and a detection model 56.

In the assembly 10 of FIG. 1A, the camera 22 has a wide field-of-view (FOV) and is coupled to a body 34 of the microscope 18. The camera 22 continuously or periodically captures images of one or more dishes 38, 40 under or near the microscope 18 on the work surface 26, and delivers the images to the imaging system 14. The wide FOV camera 22 is placed adjacent to the lens 44 of the microscope 18 to image an entire drop layout of one or more dishes 38, 40. As shown in FIG. 1A, a first dish 38 is disposed directly under the lens 44 of the microscope 18 and placed over a light source 48 on the work surface 26, and a second dish 40 is disposed adjacent to the first dish 38. The camera 22 is positioned to view each drop layout on the dish 38 directly under the microscope 18 or both dishes 38, 40 on the work surface 26. In the illustrated example assembly, the camera 22 is a webcam, but may be any suitable camera.

Returning to FIG. 1B, the system 14 can store images and image data generated by the camera 22 in the memory 52. The memory 52 may be, for example, a physical data storage device or a logical data storage area of the computer 24. Additionally, the system 14 stores data that defines the locations of each of the drops of each dish in the memory 52.

The imaging system 14 is configured to receive an image of a dish 38 having a visual characteristic and one or more drops disposed on the dish 38, and then is configured to process the image using a detection model 56 to identify the dish and/or one or more drops according to one or more visual characteristics. The imaging system 14 assigns a unique identifier to the dish and/or to the identified drop, and records the identifier of the drop associated with the drop location of the drop. The imaging system 14 may process the other drops disposed on the dish 38 in the same way. The imaging system 14 may also record visual characteristics that can be used to identify that specific dish and distinguish it from other dishes with the same drop pattern. Additionally, the imaging system 14 is configured to process the image using the detection model 56 to identify the dish 38 (e.g., dish type, orientation of the dish, drop pattern) according to one or more visual characteristics. Further, the imaging system 14 can detect when a pipette enters or exits a drop of biological material disposed on the dish 38. The imaging system 14 can track whether any biological material has been moved from the identified drop and where the biological material is moved to, keeping records of each transfer of material from one drop to another. The visual characteristic may be disposed on a dish, tube, pipette, or other vessel and may include one or more of a marking, drop pattern, drop size, drop shape, drop location, relative drop locations, barcode, tag placement, name, number, a combination of characters, or other identifier that identifies a drop type, subject, biological material, orientation, dish type, vessel type, pipette type, dish size, wells, molded in details such as well numbers or grid locations, drop type, or a combination thereof.

Specifically, the imaging system 14 is communicatively coupled to the camera 22 and receives the images from the camera 22. The system 14 then processes images to identify and/or classify various characteristics of the drop, dish, and/or pipette. The one or more data storage devices (i.e., the memory 52) of the imaging system 14 defines the detection model 56 and a database containing, for example, subject information, a plurality of visual characteristics, a plurality of types of biological material, standard operating protocols (SOPs) for the IVF process, a plurality of dish types, and a plurality of drop patterns for each of the dish types. After receiving the image from the camera 22, for example, the imaging system 14 processes the image and compares the image with information stored in the database. The detection model 56 includes various models for analyzing a variety of parameters, such as, for example, drop identification model, a material identification model, a subject identification model, a dish identification model, a pipette identification model, a pipette-in-drop identification model, a PCR tube identification model, and a vitrification device identification model.

The computer 24 is communicatively coupled to the camera 22 by a wired and/or wireless connection, such as via Bluetooth™, or radio communication (e.g., Wi-Fi). The computer 24 is configured to deliver real-time feedback in the form or prompts and/or alerts to the embryologist at each stage of the IVF process. This real-time feedback is delivered through the user interface 30 and through audible feedback, which is coupled to the computer 24.

Figure 2:
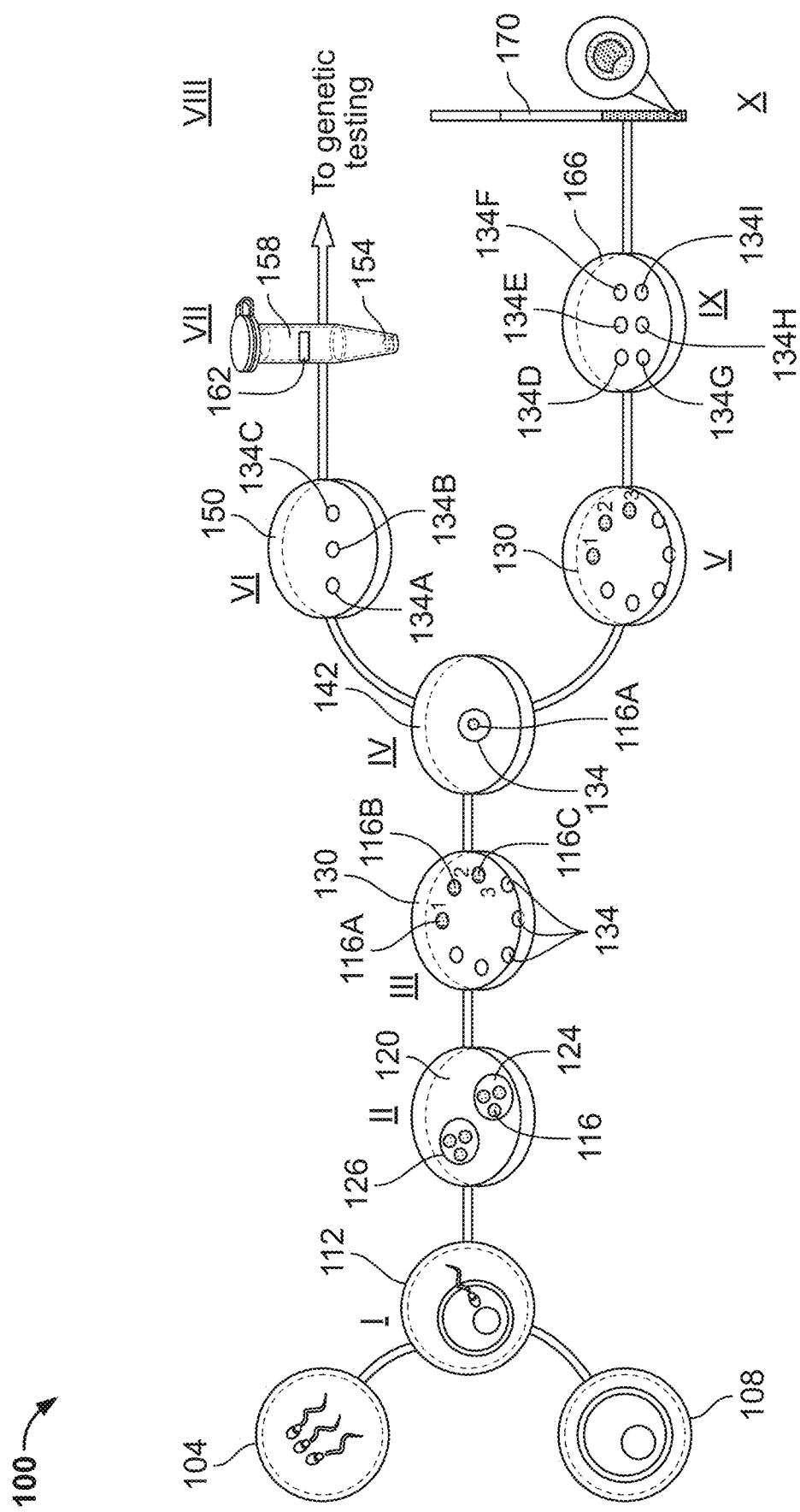
FIG. 2 is an example flow chart showing various stages of the IVF process.

Different IVF clinics have different protocols for the IVF procedure, but there are a lot of commonalities between them. FIG. 2 illustrates a flow chart of an IVF cycle 100, and will be described with reference to the assembly 10 and imaging system 14 of FIG. 1A. Initially, the cycle 100 begins at a first stage I where sperm from a semen sample 104 from patient A fertilizes a single or multiple eggs 108 from patient B in a fertilization dish 112. The fertilized eggs then become embryos 116. At a second stage II, embryos 116 are transferred to a culture dish 120 where multiple embryos 116 reside in a single drop 124. In the illustrated example, the culture dish 120 includes two drops 124, 126 each containing multiple embryos 116. However, the number of embryos may vary by subject. When the embryos 116 develop to a desired maturity, the embryos 116 are transferred from the culture dish 120 to a holding dish 130 at a third stage III, where each embryo 116A, 116B, 116C is disposed in a drop 134 and is assigned an identity (e.g., numbers, letters, or combination thereof) in the dish 130. In the illustrated example, first, second, and third embryos 116A, 116B, 116C, are assigned numbers 1, 2, 3, respectively. As these embryos are moved between drops and dishes, their new location will be recorded by the system 14. Further, the system 14 can identify how many empty drops remain on the dish 130 by assuming that each drop that is not accessed by the pipette remains empty. The system 14 also records which drop(s) contain(s) an embryo (or biopsy at subsequent stages) and can alert an embryologist not to dispose an embryo into a drop already containing an embryo (or biopsy).

Figure 3:
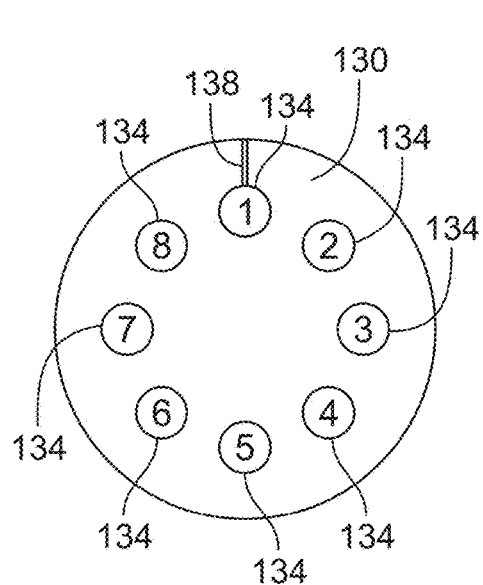
FIG. 3 is a top view of an example dish configured for use with the assembly of FIG. 1A.
Figure 4:
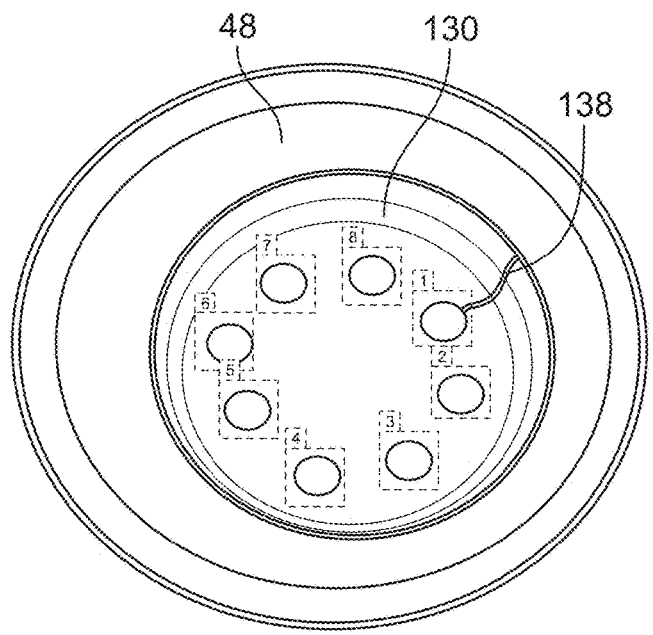
FIG. 4 is a top view of the dish of FIG. 3 in a different orientation.
Figure 5:
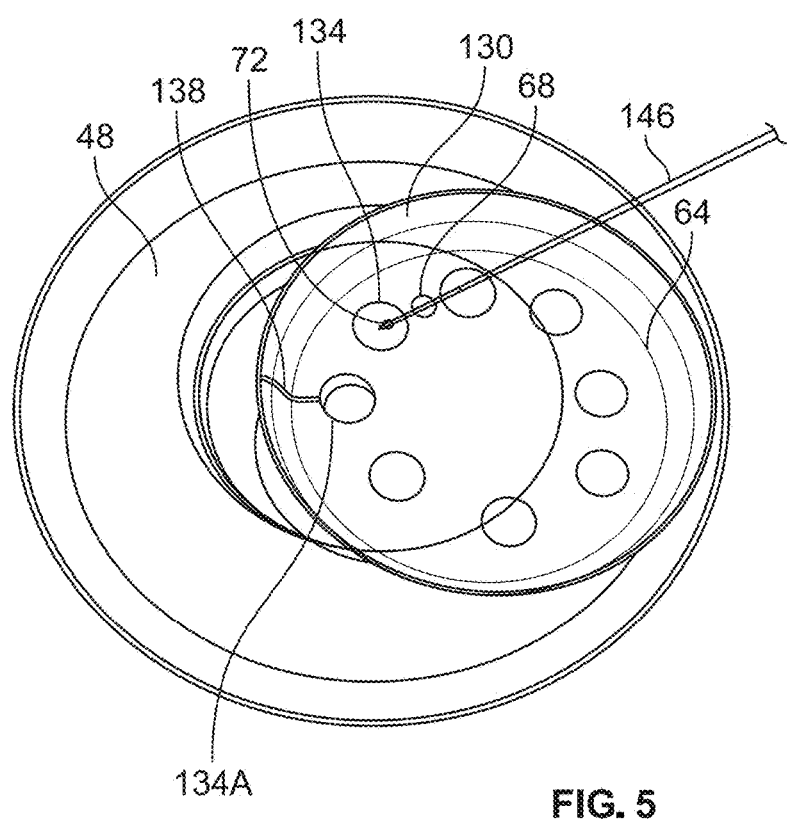
FIG. 5 is a top view of a pipette disposed in a drop of the dish of FIG. 3.

At the third stage III, the camera 22 attached to the microscope 18 of FIG. 1A captures images of the entire holding dish 130. The holding dish 130 has a plurality of drops 134 (e.g., eight drops) arranged in a circle on the surface of the dish 130, as shown in FIGS. 3-5. At a 12 o'clock position (relative to the orientation of FIG. 3), the dish 130 includes a visual marking 138 or characteristic that can be identified by the imaging system 14. The characteristic 138 in this example is a thick line extending radially outwardly from a first drop location 1 to an edge of the dish 130. The imaging system 14 is configured to identify and track each drop on the dish 130 by assigning each drop with an identifier, such as, for example, a number (e.g., numbers 1 through 8) relative to characteristic 138. The system 14 tracks the location of the drops 134 as the dish 130 moves (rotationally or translationally) from an original position and within the FOV of the camera 22. For example, the system 14 tracks a first drop location 1 from the twelve o'clock position illustrated in FIG. 3 to a two o'clock position in FIG. 4. In some examples, the drops 134 are mapped to a known drop pattern or pattern layout stored in the memory 52 of the system 14 at the third stage III. For example, the system 14 can identify the circular layout or pattern of the drops 134 of the first dish 38 as being a holding dish 130 for mature embryos.

Turning back to FIG. 2, a fourth stage IV of the IVF cycle 100 involves transferring an embryo (e.g., embryo 116A) from the first drop location 1 of the holding dish 130 to a biopsy dish 142 (e.g., to remove a few cells from the embryo that will be used for genetic testing). Before the physical transfer of the embryo 116A, the camera 22 captures an image of a pipette 146 adjacent to the first drop location 1 of the holding dish 130, as shown in FIG. 5. The system 14 then identifies a status or condition of the pipette 146, using a pipette identification model that classifies correlations of a pipette location relative to a drop location (i.e., pipette is adjacent to the drop location) and/or a pipette-in-drop identification model that classifies correlations of the pipette contacting the drop (i.e., pipette receives embryo assigned to the drop location). If the pipette 146 was identified as being in contact with the drop, the system 14 then stores the status data and remembers the pipette 146 is holding the embryo 116A that was formerly associated with the first drop location 1 of the holding dish 130. After an embryologist brings the second dish 40 under the microscope 18, the camera 22 captures a wide-view image (i.e., an image capturing an entire layout of the dish) of the second dish 40, and the system 14 receives the image and identifies that a different dish is under the microscope 18. The system 14 can identify that the dish 40 under the microscope 18 is a biopsy dish 142 by recognizing a single, centrally disposed drop 134 on the dish 142, and/or a patient label associated with the embryo 116A.

The status or condition of the pipette may be related to the location of the pipette (e.g., adjacent to a drop, in contact with a drop, adjacent to a PCR tube), or the contents of the pipette (e.g., delivering biological material, receiving biological material, not containing biological material, containing an embryo, containing a biopsy, containing multiple embryos, etc.). The status or condition of the pipette can also be assigned to the drop that is receiving the biological material, or the drop in which the pipette is aspirating the biological material. Additionally, the status or condition of the pipette or drop may be independently processed from providing real-time feedback to the embryologist.

Using a pipette-in-drop identification model, the system 14 can distinguish when a pipette 146 is contacting a drop 134 disposed on the dish 38. Referring to FIG. 5, first, the system 14 determines that the pipette 146 enters a layer of oil 64 on the dish 38 by identifying a first meniscus 68 adjacent to the pipette 146. The imaging system 14 processes the presence of the first meniscus 68 created by the pipette 146 and layer of oil 64 to determine that the pipette 146 is about to retrieve or deliver a biological material to the drop 134. The system 14 also determines that the pipette 146 enters the drop 134 by identifying a second meniscus 72 adjacent to the pipette 146 and closer to a distal end of the pipette 146. The system 14 processes the presence of the second meniscus 72 created by the pipette 146 and the drop 134. When the system 14 recognizes and identifies two menisci 68, 72, the system 14 determines that the pipette 146 has entered the drop 134 to deliver or retrieve a biological material. Accordingly, the system 14 can distinguish when a pipette 146 is merely adjacent to the drop 134, using the pipette identification model describe above, or is in fluid communication with the drop 134 and receives or delivers the biological material using the pipette-in-drop identification model.

As the embryologist brings the pipette 146 near the second dish 40, the system 14 analyzes the received images and determines whether the second dish 40 is an appropriate dish into which the embryologist can deposit the embryo 116A. If the second dish 40 is the correct biopsy dish 142 assigned to the subject, the system 14 delivers a "correct" message, such as a visual, audible, and/or tactile indicator, for the embryologist to proceed with transferring the embryo 116A that is held in the pipette 146 to a drop 134 on the second dish 40. However, if an incorrect dish with an identical drop pattern is brought under the microscope 18, for example, the system 14 can distinguish the first dish 38 from the second dish 40 by identifying a different visual characteristic (e.g., a marking associated with an embryo of the subject) of a plurality of characteristics that may be stored in the database. In this case, the system 14 would deliver an "incorrect" message or signal to the embryologist.

Specifically, the user interface 30 has a speaker 36 that is configured to play a sound to deliver a "correct" message and a different sound to deliver an "incorrect" message when prompted by the system 14. For example, before the embryologist transfers the biological material to a different location, the system 14 signals to the user interface 30 to deliver either the "correct" or "incorrect" message via the speaker 36 by playing the sound corresponding to the embryologist's actions. For example, each of the "correct" and "incorrect" messages has a distinct sound audible by the embryologist to alert the embryologist that the move or transfer the embryologist is about to make is either correct or incorrect. Additionally, the user interface 30 is configured to temporarily flash a message or color on a screen 37 of the user interface 30 to deliver "correct" and "incorrect" messages when prompted by the system 14. For example, before the embryologist transfers the biological material to a different location, the system 14 signals to the user interface 30 to display a first color or text on the screen 37 to deliver the "correct" message or display a second color or text on the screen 37 to deliver the "incorrect" message. In other examples, the assembly 10 may include a separate speaker and/or a separate light communicatively coupled to the system 14 to display or deliver "correct" and "incorrect" messages.

Afterwards, the biopsy dish 142 is taken away from the work surface 26 to take a biopsy from the embryo 116A. After the biopsy process, the biopsy dish 142 returns to the work surface 26 with the drop 134 holding both the embryo 116A and a biopsy of the embryo 116A. The system 14 again receives and analyzes the images of the drop 134 holding both the embryo 116A and the biopsy, and identifies that the biopsy dish 142 has both a biopsy and embryo 116 in the drop 134.

At a fifth stage V shown in FIG. 2, the embryo 116A, after having the biopsy taken from it, is transferred back to the holding dish 130. Again, before any physical transfer occurs, the system 14 identifies a status or condition of the pipette 146 at the biopsy dish 142 as the pipette is adjacent to the drop 134 using the pipette-in-drop identification model (i.e., pipette receiving embryo assigned to drop location) and stores the status data. After the embryologist brings the holding dish 130 back under the microscope 18, the camera 22 captures a wide-view image of the holding dish 130, and the system 14 receives the image and identifies that the holding dish 130 is once again under the microscope 18.

As the embryologist brings the pipette 146 near the holding dish 130, the system 14 analyzes the received images and determines whether the holding dish 130 is an appropriate dish for the embryologist to deposit the embryo 116A. The system 14 also identifies whether the pipette 146 is adjacent to the correct drop location of the holding dish 130 using the pipette identification model. If the holding dish 130 is the correct holding dish 130 assigned to the subject and the pipette 146 is adjacent to the drop location 1 from which the embryo 116A was originally drawn, the system 14 delivers (e.g., via the user interface 30) a "correct" message, such as a visual, audible, and/or tactile indicator, for the embryologist to proceed with transferring the embryo 116A held in the pipette 146 to the drop 134 at the first drop location 1 on the holding dish 130. The embryologist can then return to the biopsy dish 142—now containing a single drop 134 with only the biopsy of the embryo 116A—to remove the biopsy from the biopsy dish 142 and transfer the biopsy to a wash dish 150 to, for example, prepare the biopsy for genetic testing, as described below.

If, on the other hand, the holding dish 130 is not the correct holding dish 130 assigned to the subject, or if the pipette 146 is adjacent to an incorrect drop location, the system 14 delivers (e.g., via the user interface 30) an "error" message, such as a visual, audible, and/or tactile indicator, alerting the embryologist not to proceed with transferring the embryo 116A held in the pipette 146 to the holding dish 130 and/or to the incorrect drop location on the holding dish 130.

At a sixth stage VI, the biopsy from the biopsy dish 142 is transferred to a wash dish 150 having three separate washing drops 134A, 134B, and 134C. Once again, before physically transferring the biological material between dishes, the system 14 first identifies a status or condition of the pipette 146 at the biopsy dish 142 as the pipette 146 is adjacent to the drop 134 using the pipette identification model and stores the status data. Once the pipette 146 is in the drop 134, the system 14, using the pipette-in-drop identification model, identifies and records the status or condition of the pipette 146 as receiving the biopsy. After receiving the biopsy in the pipette 146, the embryologist replaces the biopsy dish 142 with the wash dish 150 under the microscope 18. The camera 22 captures a wide-view image of the wash dish 150, and the system 14 receives the image and identifies that the wash dish 150 is a different dish from the biopsy dish 142. The system 14 can identify that the dish under the microscope is a wash dish 150 by recognizing a pattern of three separate drops 134A, 134B, 134C that are centrally disposed on the dish 150, or by reading and recognizing another characteristic on the dish 150.

As the embryologist brings the pipette 146 holding the biopsy near the first wash drop 134A of the wash dish 150, the system 14 analyzes the received images and determines whether the wash dish 150 is an appropriate dish for the embryologist to deposit the biopsy, and whether the first wash drop 134A is the correct drop in accordance with SOP of the IVF cycle. If the washing stage VI is the correct stage of the IVF cycle, the system 14 delivers (e.g., via the user interface 30) a "correct" message, such as a visual, audible, and/or tactile indicator, for the embryologist to proceed with transferring the biopsy held in the pipette 146 to the first wash drop 134A on the wash dish 150. However, the embryologist will receive an "error" message if the dish or the location on the dish is incorrect or does not correlate with SOP.

At the sixth stage VI, the system 14 tracks the biopsy as the embryologist moves the biopsy from the first wash drop 134A to a second wash drop 134B and from the second wash drop 134B to a third wash drop 134C. As the biopsy moves from one drop to another, the system 14 processes the movement of the biopsy and records the new location of the biopsy in the wash drop. After picking up the biopsy from each wash drop, the system 14 receives and analyzes images of the wash dish 150 and pipette 146, and identifies the status or condition of the pipette 146 holding the biopsy using the pipette identification model and/or the pipette-in-drop identification model. If, for example, the embryologist picks up the biopsy from the first wash drop 134A and places the pipette 146 adjacent to the third wash drop 134C (thereby skipping the second wash drop), the system 14 will recognize the movement of the pipette 146 as out of sequence compared to a stored order of washing steps according to SOP, and will deliver an "error" message.

At a seventh stage VII of the IVF cycle in FIG. 2, a washed biopsy 154 is transferred to a PCR tube 158 having a unique identifier 162 (e.g., barcode, 2D barcode, QR code, numbers, letters, or a combination thereof). Again, before physically transferring the biopsy from the pipette 146, the system 14 identifies a status or condition of the pipette 146 adjacent to the PCR tube 158 using the pipette identification model and stores the status data. The camera 22 captures a wide-view image of the PCR tube 158 under the microscope 18 and delivers the image to the system 14. From the image, the system 14 identifies the PCR tube 158 as a different vessel than the wash dish 150 (e.g., via a PCR tube identification model). The system 14 also reads the unique identifier 162 of the PCR tube 158 and determines that the PCR tube 158 corresponds with the embryo 116A from which the biopsy 154 was taken and is associated with the correct subject. The system 14 causes the user interface 30 to deliver a "correct" message, such as a visual, audible, or tactile indicator, to the embryologist to proceed with transferring the biopsy 154 held in the pipette 146 to the PCR tube 158. The system 14 can also track when the pipette 146 goes into and comes out of the PCR tube 158 using the pipette-in-drop identification model. The PCR tube 158 containing the biopsy is then sent to genetic testing at an eighth stage VIII.

If a PCR tube 158 has been identified but the identifier 162 cannot be seen, the system 14 will prompt the embryologist to rotate the tube 158 until the identifier 162 can be seen.

The unique identifier 162 can be a pre-printed 2D barcode that is imaged by the camera 22 and processed by the system 14. The system 14 records the transfer of the biopsy from the wash dish 150 to the PCR tube 158 and records the location of the biopsy 154 with the unique identifier 162 of the PCR tube 158.

At a ninth stage IX, the embryo 116A from the holding dish 130 is transferred to a pre-vitrification dish 166 to prepare the embryo 116A for vitrification in the cryopreservation device 32. Once again, before physically transferring the biological material between dishes, the system 14 first identifies a status or condition of the pipette 146 at the holding dish 130 as the pipette 146 is adjacent to the drop 134 at the first drop location 1 using the pipette identification model and stores the status data. After delivering a "correct" message to the embryologist, the system 14 then identifies a status or condition of the pipette 146 entering the drop 134 at the first drop location 1 using the pipette-in-drop identification model (i.e., pipette receiving embryo). After receiving the embryo 116A in the pipette 146, the embryologist replaces the holding dish 130 with the pre-vitrification dish 166 under the microscope 18. The camera 22 captures a wide-view image of the pre-vitrification dish 166, and the system 14 receives the image and identifies that the pre-vitrification dish 166 is a different dish from the holding dish 130. The system 14 can identify that the dish under the microscope 18 is a pre-vitrification dish 166 by recognizing a pattern of two rows of three separate washing drops 134D, 134E, 134F, 134G, 134H, 134I that are centrally disposed on the dish 166, or by reading and recognizing another characteristic on the dish 166.

As the embryologist brings the pipette 146 holding the embryo 116A near the first wash drop 134D of the pre-vitrification dish 166, the system 14 analyzes the received images and determines whether the pre-vitrification dish 166 is an appropriate dish for the embryologist to deposit the embryo 116A, and whether the first wash drop 134D is the correct drop in accordance with SOP of the IVF cycle. If the pre-vitrification processing stage is the correct stage of the IVF cycle 100, the system 14 delivers (e.g., via the user interface 30) a "correct" message, such as a visual, audible, or tactile indicator, for the embryologist to proceed with transferring the embryo 116A held in the pipette 146 to the first wash drop 134D on the pre-vitrification dish 166. On the other hand, the embryologist will receive an "error" message if the dish or the location on the dish is incorrect or does not correlate with SOP.

Additionally at the ninth stage IX, the system 14 tracks the embryo 116A as the embryologist moves the embryo 116A from the first wash drop 134D to a second wash drop 134E, from the second wash drop 134E, and to a third wash drop 134F. Fourth, fifth, and sixth wash drops 134G, 134H, 134I are used for another embryo. According to SOP, the embryo 116A is placed in each drop for a pre-determined amount of time, and each drop may have a different wash time. After picking up the embryo from each pre-vitrification wash drop 134D, 134E, 134F, the system 14 receives and analyzes images of the pre-vitrification dish 166 and pipette 146, and identifies the status or condition of the pipette 146 holding the embryo 116A using the pipette identification model and/or pipette-in-drop identification model at each drop. The system 14 initiates a timer for a set period of time the embryo 116A should spend in each wash drop 134D-I, and alerts the embryologist when the embryo 116A should be retrieved and transferred to the next drop. If, for example, the embryologist picks up the embryo 116A from the first wash drop 134D and places the pipette 146 adjacent to the third wash drop 134F (thereby skipping the second wash drop 135E), the system 14 will recognize the movement of the pipette 146 as out of sequence compared to a stored order of pre-vitrification washing steps according to SOP, and will deliver an "error" message.

At a tenth stage X, the embryo 116A is transferred from the third drop 134F of the pre-vitrification dish 166 to a vitrification device (such as a VitriGuard® or Cryotop®) 170 having a unique identifier. The camera 22 captures a wide-view image of the vitrification device 170 under the microscope 18 and delivers the image to the system 14. From the image, the system 14 identifies the vitrification device 170 as a different vessel than the pre-vitrification dish 166 (e.g., via a vitrification device identification model). The system 14 also reads the unique identifier of the vitrification device 170 and determines that the vitrification device 170 corresponds with the embryo 116A. The system 14 causes the user interface 30 to deliver a "correct" message, such as a visual, audible, or tactile indicator, to the embryologist to proceed with transferring the embryo 116A held in the pipette to the vitrification device 170. The system 14 can also track when the pipette 146 goes into and comes out of the vitrification device 170. The vitrification device 170 holding the embryo 116A is then plunged into liquid nitrogen to vitrify the embryo, before it is placed in the cryopreservation device 32, where the embryo 116A is stored while the biopsy is tested.

Figure 6:
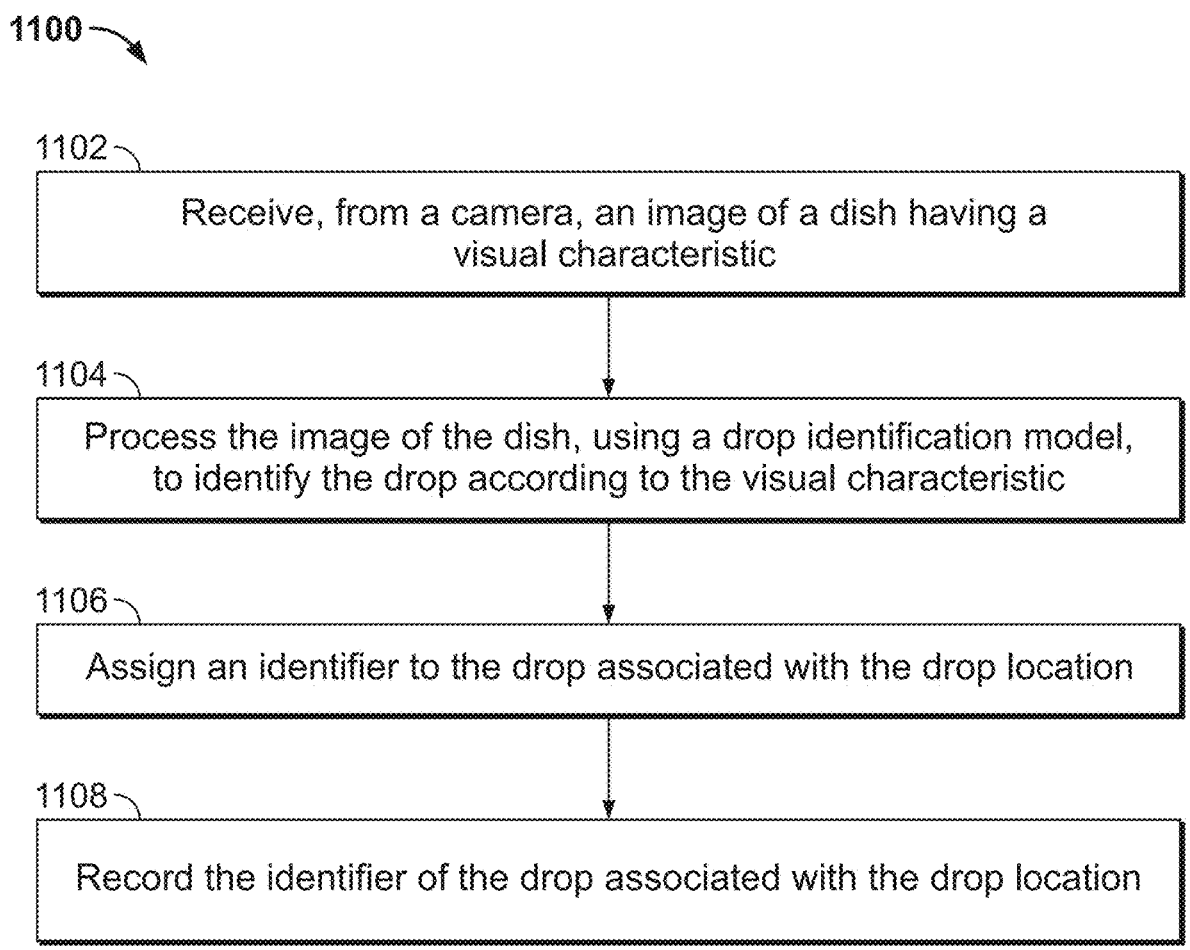
FIG. 6 is a flow chart showing a method of tracking biological material in an IVF process in accordance with the teachings of the present disclosure.

Turning now to FIG. 6, a flow chart represents an example method 1100 for tracking a subject's biological material in an IVF process, such as the process 100 of FIG. 2. The method 1100 is performed by the imaging system 14 via one or more computers and includes a step 1102 of receiving, from a camera 22, an image of a dish 38 where the dish has a visual characteristic 138. In the illustrated example, the dish 38 is holding a biological material at a drop location. The visual characteristic 138 may be one or more of a marking, drop pattern, barcode, name, number, a combination of characters, or other identifier that identifies a subject, biological material, dish type, dish orientation, and/or drop type. The system 14 then processes the image in step 1104, using a drop identification model, to identify the drop 134 according to one or more visual characteristics 138 on the dish 38. The system 14 assigns, in step 1106, an identifier to the drop 134 associated with the drop location, and records in the memory the identifier (e.g., drop adjacent to marking) of the drop 134 associated with the drop location 1 in step 1108. For example, the system 14 receives an image of the dish 38 from the camera 22 when the dish 38 is at the third stage III of the process 100 illustrated in FIG. 2. Using the drop identification model of the detection model 56, the system 14 processes the image of the drop to identify and assign an identifier (e.g., drop adjacent to marking 138) to the drop 134 as being associated with the first drop location 1.

In another step, the system 14 may further process the image, using a material identification model, to classify a type of biological material (e.g., one or more embryos, biopsy, embryo and biopsy) associated with the drop location on the dish 38. The system 14 identifies the biological material associated with the drop location, and records an identifier (e.g., "embryo 1 of Subject X") associated with the drop location 1. For example, the system 14 receives an image of the dish 38 from the camera 22 when the dish 38 is at the third stage III of the process 100 illustrated in FIG. 2. Using the material identification model of the detection model 56, the system 14 processes the image of a biological material in a drop to classify the biological material as a first embryo 116A associated with the first drop location 1.

In another step, the system 14 may further process the image of the dish 38, using a dish identification model, to uniquely identify the dish 38 according to the visual characteristic 138 and/or classify a type of dish according to the visual characteristic 138 and then identify (e.g., by recording in the memory) the dish according to that visual characteristic. For example, the system 14 processes the marking 138 (i.e., the visual characteristic) of the holding dish 130 (FIGS. 3-5) to classify an orientation of the dish, and then maps each drop location 1, 2, and 3 to a different embryo 116A, 116B, and 116C as each embryo is disposed in its respective drop 134. The system 14 then stores this data in a memory to track the movement of each embryo 116 during the IVF process.

At the same time, the system 14 can process the image of the dish, using a subject identification model, to classify a subject identification associated with the dish, and record in the memory 52 the subject identification associated with the dish. For example, the system 14 can process a subject identifier (e.g., a unique ID associated with the patient) disposed on the dish 38, and record that the dish 38 that is under the microscope 18 is associated with the subject. This ensures that the transfer of biological material of the subject remains with the dishes associated with the subject throughout the IVF process. In other examples, the system 14 communicates with the RFID reader 33 to associate the subject with the dish under the microscope 18.

Additionally, the system 14 can process the image of the dish 38 having a drop pattern, using a drop pattern identification model, to classify a type of dish associated with the drop pattern. For example, the system 14 processes the drop pattern of the dish 38 to classify the dish 38 as a holding dish 130 by recognizing a circular drop arrangement and containing a plurality of embryos 116A, 116B, and 116C in separate drops 134. The system 14 can learn, using machine learning techniques (described below), how to recognize different dishes by identifying drop patterns and determining the likelihood of proper dish classification. The steps 1102 through 1108 of the method 1100 can be performed at various stages of the process 100 before retrieving an embryo or biopsy with the pipette 146 from any drop or vessel (e.g., dish, tube, device, etc.).

In another step, the system 14 may further process the image of the vitrification device 170, using a vitrification device identification model, to classify a type of vitrification device according to the visual characteristic and then identify (e.g., by recording in the memory) the vitrification device according to that visual characteristic. In yet another step, the system 14 may further process the image of the PCR tube, using a PCR tube identification model, to classify a type of PCR tube according to the visual characteristic and then identify (e.g., by recording in the memory) the PR tube according to that visual characteristic.

Before the embryologist retrieves the biological material from the drop location, the method 1100 may further include a step of processing an image of the dish 38 and pipette 146 to identify a first status or condition of the pipette 146 at or near the drop location. After a predetermined time has passed, or after processing and identifying that the pipette 146 enters the drop at the drop location, the system 14 determines that the pipette 146 receives the biological material at the drop location. The system 14 records in the memory the first status or condition of the pipette 146 holding the biological material. For example at stage III of the process 100 illustrated in FIG. 2, the system 14 determines that the pipette 146 retrieves the embryo 116A at the drop location 1 and determines that the pipette 146 is now holding the embryo 116A of the subject. The system 14 then records that the location of the embryo 116A is now in the pipette 146.

The method 1100 may further include a step of identifying a second status or condition of the pipette 146 holding the biological material at a second location. Before the biological material is delivered to the second location, the system 14 determines whether the second location for depositing the biological material correlates with SOP stored in a database of the memory 52. This step includes receiving an image from the camera 22 of the second location (e.g., a different dish or vessel or a different drop on the same dish), and processing the image to classify the second location. The system 14 provides real-time feedback to an embryologist that the second drop location is the correct or incorrect drop location before the embryologist delivers the biological material to the second location. Once the biological material is delivered, the system 14 records a delivery status of the biological material from the pipette and to the second location.

For example at stage IV of the process 100 illustrated in FIG. 2, the system 14 identifies that the pipette 146 holding the embryo 116A is hovering over a different dish 40, and processes the image of the second dish 40 and pipette 146 to identify that the pipette 146 is disposed above a biopsy dish 142 having a single, centrally-disposed drop 134. In accordance with SOP of the IVF process stored in the database, the system 14 delivers a "correct" signal or message to the embryologist to proceed with delivering the embryo 116A held in the pipette 146 to the drop 134 on the biopsy dish 142. The system 14 then records the new location of the embryo 116A associated with the subject. This method step can be repeated (e.g., identifying a third status or condition, a fourth status or condition, etc.) before delivering an embryo or biopsy using the pipette 146 from any drop or vessel (e.g., dish, tube, device) at subsequent stages of the IVF process. After each delivery, the system 14 records the delivery status and new location of the biological material.

As briefly discussed above, a machine learning model may be configured to process a model input that includes a set of drop patterns for a dish to generate a model output that characterizes a likelihood that the drop pattern is associated with a particular type of dish. A few examples of possible model outputs of the machine learning model are described next.

In some implementations, the model output of the machine learning model can include a hard classification that identifies the dish as being included in one category from a set of categories that includes: a culture dish 120 (i.e., indicating that the dish under the microscope has one or more drops containing one or more embryos each from a single subject), a holding dish 130 (i.e., indicating that the dish under the microscope has a plurality of drops, each drop containing one embryo), a biopsy dish 142 (i.e., indicating that the dish under the microscope has one drop containing a single embryo, a single biopsy, or a single embryo and a single biopsy), a wash dish 150 (i.e., indicating that the dish under the microscope has separate drops in a row), and a pre-vitrification dish 166 (i.e., indicating that the dish under the microscope has a plurality of rows of drops). These categories are determined specifically for the IVF process 100 of FIG. 2, and may vary according to the particular IVF lab.

In some implementations, the model output of the machine learning model can include a soft (probabilistic) classification that defines a score distribution over a set of categories. The set of categories can include a culture dish, a holding dish, a biopsy dish, a wash dish, and a pre-vitrification dish, as described above. The score for each category can define a likelihood (probability) that the dish is included in the category.

The machine learning model can have any appropriate machine learning model architecture that enables the machine learning model to perform its described functions. For instance, the machine learning model can be implemented, for example, as a neural network model, or a random forest model, or a support vector machine model, or a decision tree model, or a linear regression model, etc. In implementations, where the machine learning model is implemented as a neural network model, the machine learning model can include any appropriate types of neural network layers (e.g., fully connected layers, convolutional layers, attention layers, etc.) in any appropriate number (e.g., 5 layers, 10 layers, or 50 layers) and connected in any appropriate configuration (e.g., as a linear sequence of layers). In implementations where the machine learning model is implemented as a decision tree model, the machine learning model can include any appropriate number of vertices, and can implement any appropriate splitting function at each vertex.

The machine learning model can include a set of machine learning model parameters. For instance, for a machine learning model implemented as a neural network model, the set of machine learning model parameters can define the weights and biases of the neural network layers of the machine learning model. As another example, for a machine learning model implemented as a decision tree, the set of machine learning model parameters can define parameters of a respective splitting function used at each vertex of the decision tree. To generate a model output, the machine learning model can process a model input in accordance with values of the set of machine learning model parameters.

A screening system can use a training system to train the machine learning model on a set of training examples. More specifically, the training system can determine trained values of the set of machine learning model parameters of the machine learning model by a machine learning training technique.

The training system uses a training engine to train the set of machine learning model parameters of the machine learning model on a set of training examples. Each training example can correspond to a dish (referred to for convenience as a "training dish") and can include: (i) a model input that includes a set of drop patterns characterizing the dish, and (ii) a target dish classification of the dish under the microscope. For each training example, the training engine trains the machine learning model to process the model input of the training example to generate a model output that matches the target dish classification of the training dish. More specifically, the training engine trains the machine learning model, by a machine learning training technique, to optimize an objective function that measures an error between: (i) the model output generated by the machine learning model for the training dish, and (ii) the target dish classification of the training dish. The objective function can measure the error between a model output and a target dish classification in any appropriate way, e.g., as a squared error or as an absolute error.

The training engine can train the machine learning model using any machine learning training technique appropriate for the architecture of the machine learning model. For instance, if the machine learning model is implemented as a neural network model, then the training engine can train the machine learning model using stochastic gradient descent.

While the categories of the disclosed machine learning model includes culture dish, holding dish, biopsy dish, wash dish, and pre-vitrification dish, each dish having a particular pattern shown in FIG. 2, the categories may be defined differently and according to a particular IVF process. For example, different stages of the IVF process 100 of FIG. 2 can vary by IVF lab. For example, in some IVF labs, the biopsy dish may contain two or more separate drops disposed in a vertical column, each containing an embryo and/or biopsy. In this case, the machine learning model category "biopsy dish" would be associated with two or more separate drops disposed in a vertical column.

Figure 7:
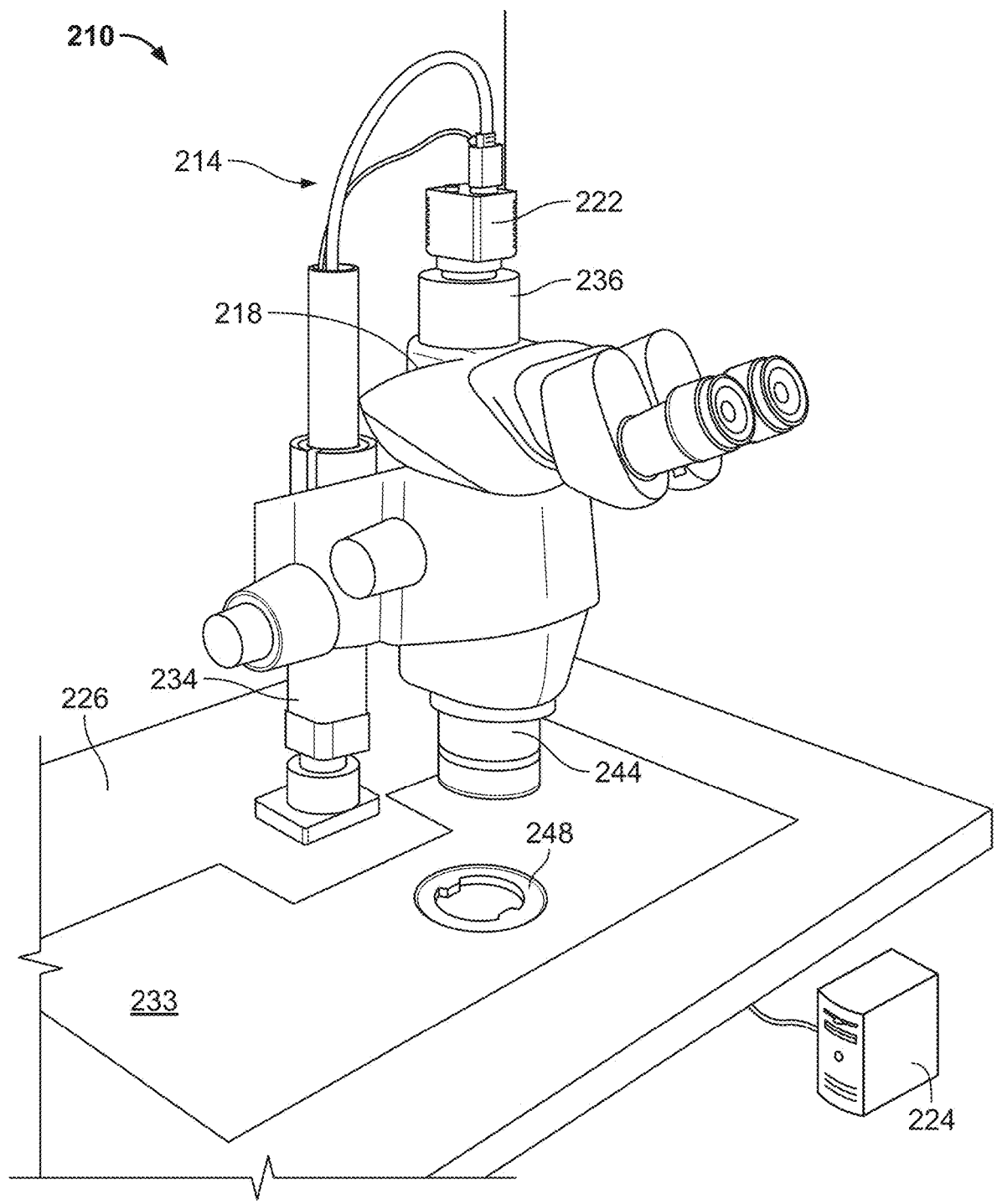
FIG. 7 is a perspective view of a different workbench assembly and imaging system for tracking a biological material in an IVF process in accordance with the teachings of the present disclosure.

While the assembly 10 in FIG. 1A is described as having the camera 22 externally mounted to the microscope 18, in certain examples, the imaging system may utilize a camera integral with the microscope or mounted to the microscope in a different way. Turning now to FIG. 7, for example, an assembly 210 includes a microscope 218 including a microscope camera 222 and an imaging system 214 for tracking biological material in an IVF process, such as the IVF process 100 of FIG. 2, and for performing the method 1100 of FIG. 6. The second example assembly 210 is similar to the first assembly 10 of FIG. 1A, and the imaging system 214 is similar to the first imaging system 14 of FIG. 1B, and also includes a memory and a detection model. Thus, for ease of reference, and to the extent possible, the same or similar components of the second example assembly 210 will retain the same reference numbers as outlined above with respect to the first example assembly 10, although the reference numbers will be increased by 200. However, the second example assembly 210 differs from the first example assembly 10 in the manner discussed below.

Figure 8:
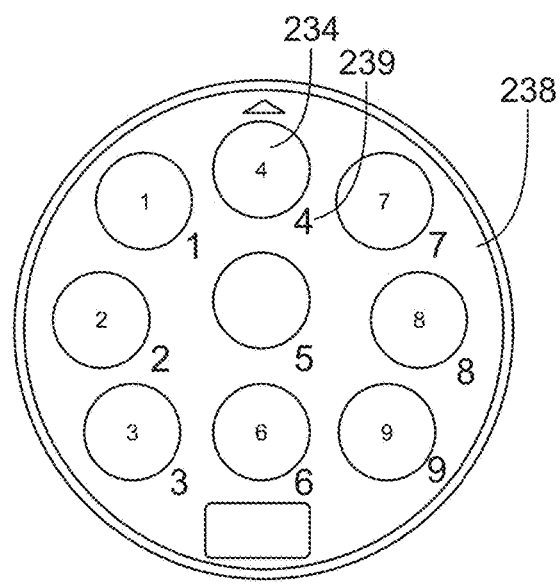
FIG. 8 is a top view of an example dish configured for use with the assembly of FIG. 7.
Figure 9:
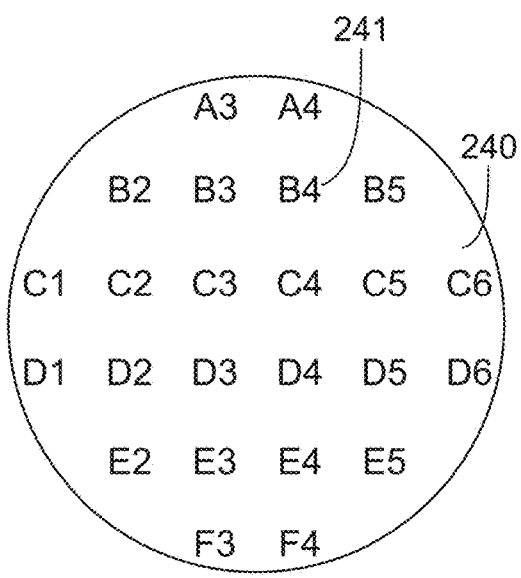
FIG. 9 is a top view of another example dish configured for use with the assembly of FIG. 7.

The second example microscope 218 includes a microscope camera 222 integrated with a head 236 of the microscope 218. The microscope camera 222 may be a digital video camera that records the microscope image, and is configured to take magnified views of a dish under the lens 244 of the microscope 218. As shown in FIGS. 8 and 9, dishes 238, 240 for use with the imaging system 214 are labeled with numbers 239 and/or coordinates 241 to help identify a location of a drop under the microscope 218. Referring specifically to FIG. 8, the dish 238 for use with the imaging system 214 includes nine separate drop locations 1-9, each labeled with a number adjacent to a designated area 235 for a drop. Referring to FIG. 9, the dish 240 for use with the imaging system 214 includes a plurality of spaced-apart coordinates 241 arranged in a grid and displays a combination of letters and numbers to indicate coordinate positions.

Figure 10:
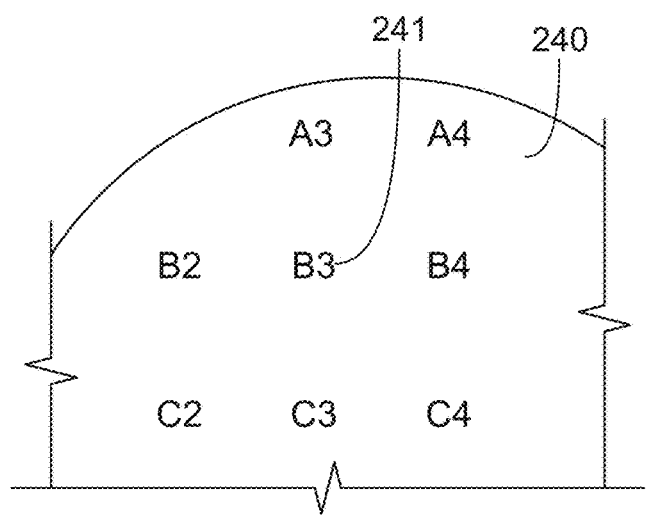
FIG. 10 is a top, magnified view of a portion of the dish of FIG. 9.

Additionally, the imaging system 214 is configured to receive an image of a magnified view of the dish 240, as shown in FIG. 10. In this case, the imaging system 214 processes the image to identify the dish 240 according to a visual characteristic on the dish with a drop location of the dish. The visual characteristics of the dishes 240 of FIGS. 9 and 10 are labeled with coordinates 241 to identify the drop location (e.g., A3, A4, B2, B3, etc.).

The microscope camera 222 can send images of the biological material disposed in the drops on the dish, and the imaging system 214 can process the image to identify the biological material (e.g., embryo, biopsy, or both embryo and biopsy) associated with the drop location of the dish. For example, after the biopsy process, the biopsy dish 142 returns to the work surface 226 with the drop 134 holding both the embryo 116A and a biopsy of the embryo 116A. The imaging system 214 again receives and analyzes the images (taken by the microscope camera 222) of the drop 134 holding both the embryo 116A and the biopsy, and identifies that the biopsy dish 142 contains both a biopsy and the embryo 116 in the drop 134.

Figure 11:
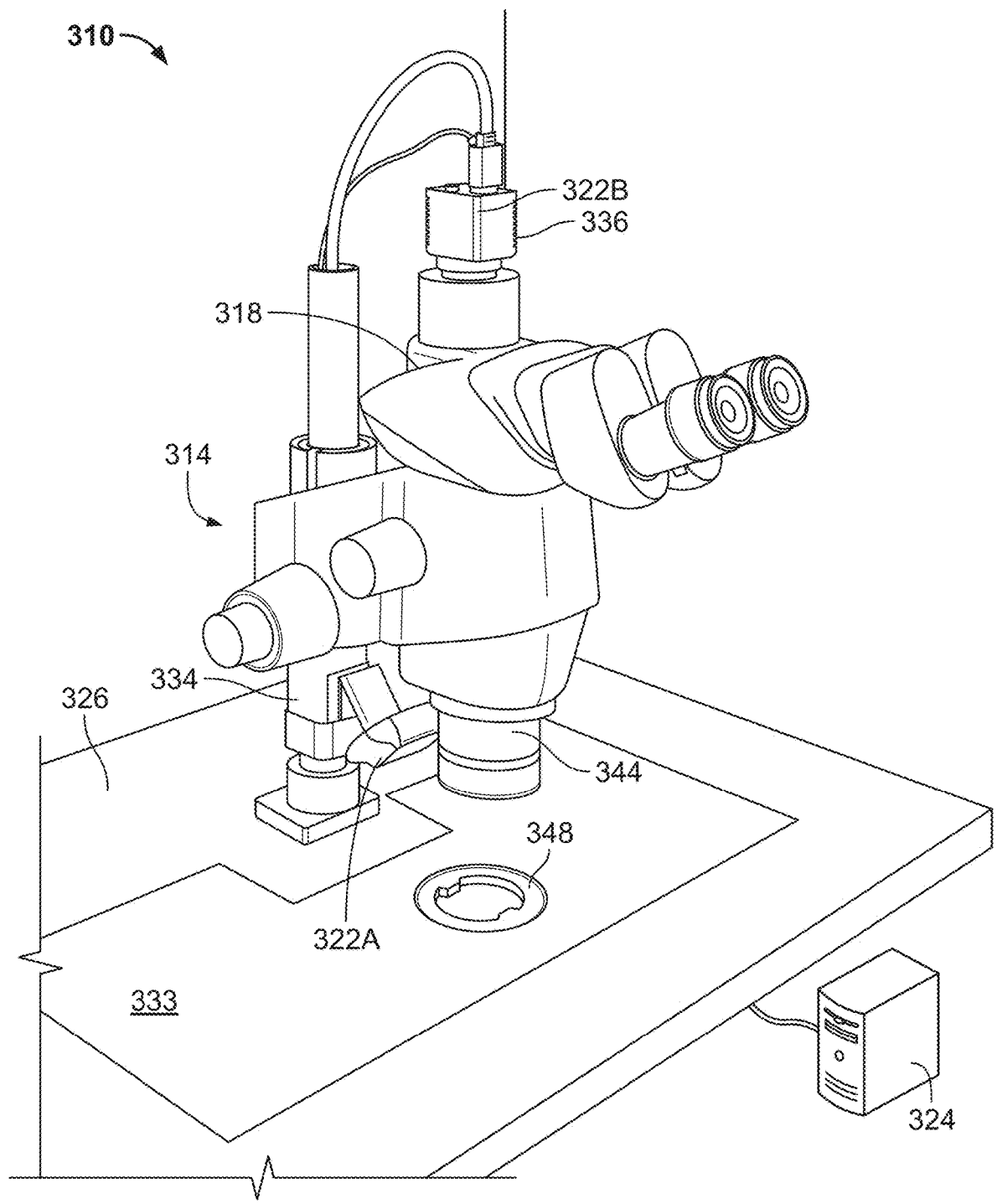
FIG. 11 is a perspective view of a different workbench assembly and imaging system for tracking a biological material in an IVF process in accordance with the teachings of the present disclosure.

While the imaging systems 14, 214 described above rely on images obtained from either a camera mounted externally to the microscope or to a microscope camera of the microscope, in certain embodiments, the imaging system may utilize images from both types of cameras. Turning now to FIG. 11, for example, a third example assembly 310 includes an imaging system 314 for tracking biological material in an IVF process, such as the process 100 depicted in FIG. 2, and for performing the method 1100 of FIG. 6. The third example assembly 310 is similar to the assembly 10 of FIG. 1A, and the imaging system 314 is similar to the imaging system 14 of FIG. 1B, and also includes a memory and a detection model. Thus, for ease of reference, and to the extent possible, the same or similar components of the third example assembly 310 will retain the same reference numbers as outlined above with respect to the first example assembly 10, although the reference numbers will be increased by 300. However, the third example assembly 310 differs from the first example assembly 10 in the manner discussed below.

Similar to the first example assembly 10, the third example assembly 310 includes a wide FOV camera 322A coupled to a body 334 of the microscope 318. Similar to the second example microscope 218, the third example microscope 318 includes a microscope camera 322B integrated with a head 336 of the microscope 318. The imaging system 314 includes the wide FOV and microscope cameras 322A, 322B that are configured to capture and send images of dishes, vessels, and objects underneath the microscope 318 or elsewhere on the work surface 326 to the imaging system 314 for processing and tracking.

Figure 12:
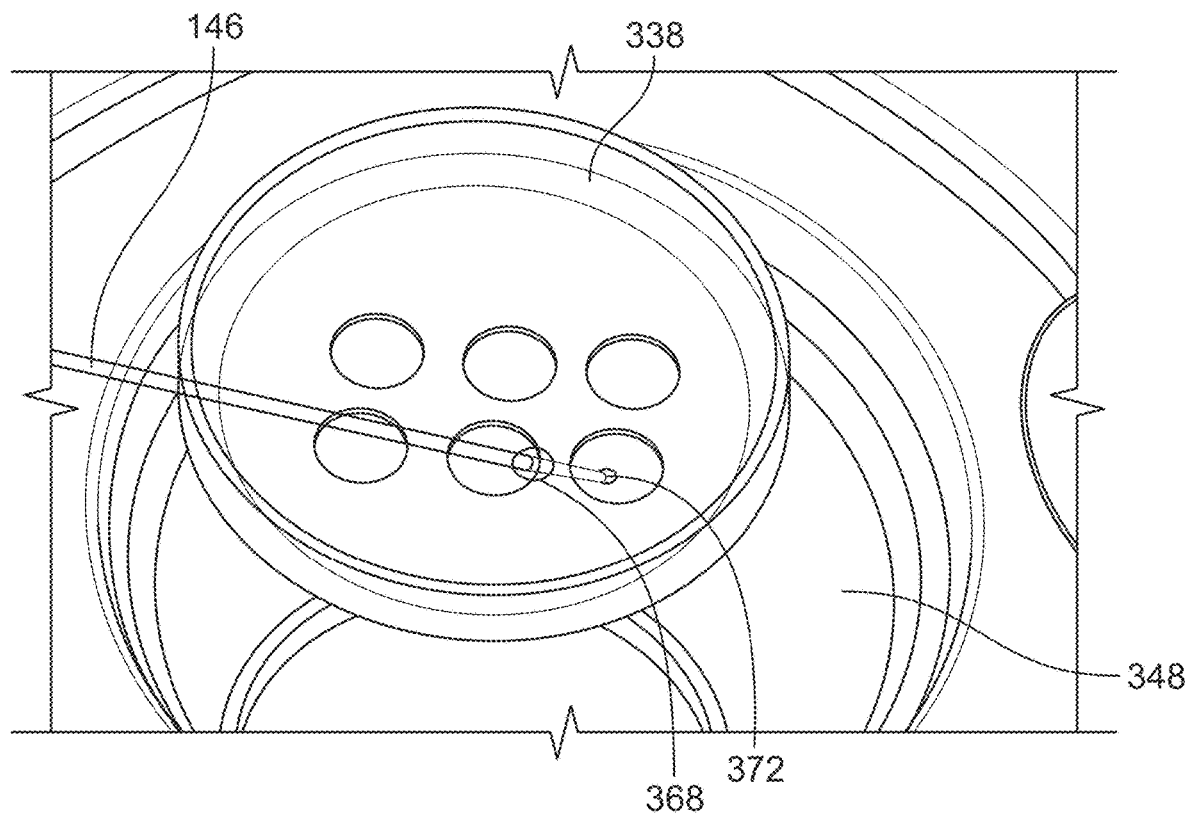
FIG. 12 is a top view of a pipette disposed in a drop of a dish configured for use with the assembly of FIG. 11.
Figure 13:
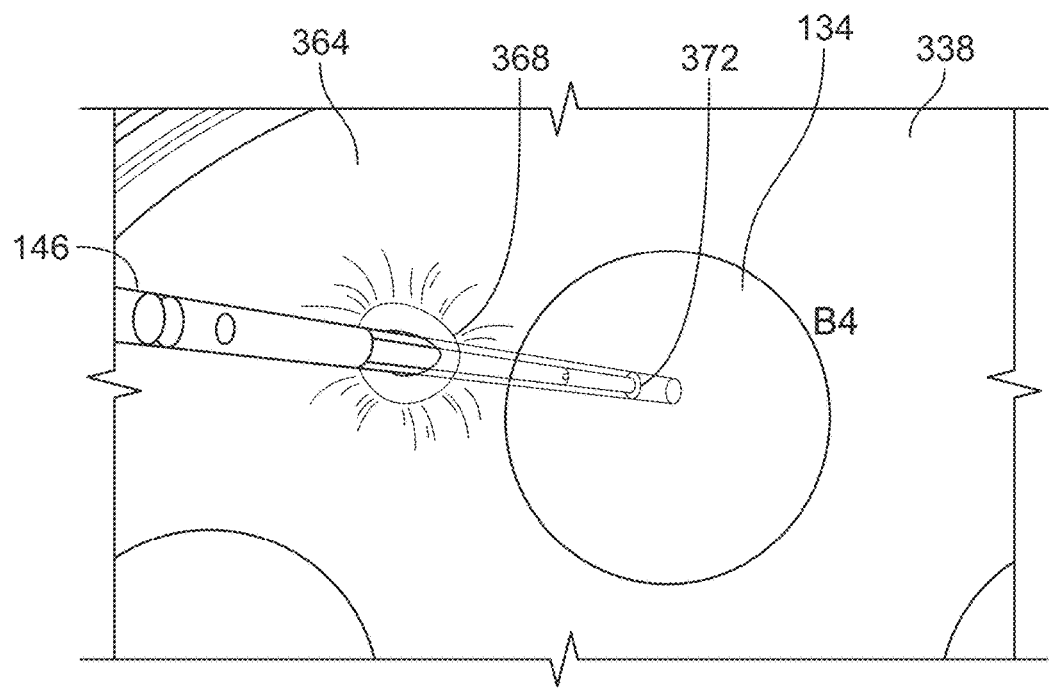
FIG. 13 is a magnified view of the pipette disposed in the drop of the dish of FIG. 12.

At each stage of the process 100, the system 314 receives a wide FOV image of a dish 338, as shown in FIG. 12, and a magnified image of the dish 338, as shown in FIG. 13. The system 314 can be used with any one of the different dishes shown in FIGS. 3-5 and 8-10 to accurately identify and track any transfers of biological material between different dishes, vessels, pipettes, and drop locations on the work surface 326.

Using the pipette-in-drop identification model described above, the system 314 can distinguish when a pipette 146 enters or exits a drop 134 disposed on the dish 338 as well as when the pipette 146 receives the biological material. Referring to FIG. 13, first, the system determines that the pipette 146 enters a layer of oil 364 on the dish 338 by identifying a first meniscus 368 adjacent to the pipette 146. The imaging system 314 processes the presence of the first meniscus 368 created by the pipette 146 and layer of oil 364 to determine that the pipette 146 is about to retrieve or deliver a biological material to the drop 134. The system 314 also determines that the pipette 146 enters the drop 134 by identifying a second meniscus 372 adjacent to the pipette and closer to a distal end of the pipette. The system 314 processes the presence of the second meniscus 372 created by the pipette 146 and the drop 134. When the system 314 recognizes and identifies two menisci 368, 372, the system 314 determines that the pipette 146 has entered the drop 134 to deliver or retrieve a biological material. Further, using the microscope camera 322, the imaging system 314 can determine whether the pipette 146 receives the biological material into the pipette 146 or delivers the biological material into the drop. In some examples, the microscope 322 camera may also be able to detect when the tip of the pipette 146 is in the drop 134 by seeing that it comes more clearly into focus, or bends as it touches the bottom of the dish, or some other indication. The system 214 including the microscope camera 222 of FIG. 7 can also be configured to identify this level of detail, as well.

In FIGS. 14-20, alternative systems for tracking biological material during an IVF process are illustrated. The assemblies of FIGS. 14-20 may be configured for tracking biological material without using image recognition software or machine learning. Instead, the assemblies of FIGS. 14-20 rely on RFID technology to identify the unique ID of each dish under the microscope. The unique drop identities for each drop on the dish is made up of RFID tag code and drop position. For ease of reference, and to the extent possible, the same or similar components of each assembly will retain the same reference numbers as outlined above with respect to the first example assembly 10 discussed above, although the reference numbers will be increased by 400 for the assembly 410 of FIG. 14, and 100 thereafter.

Figure 14:
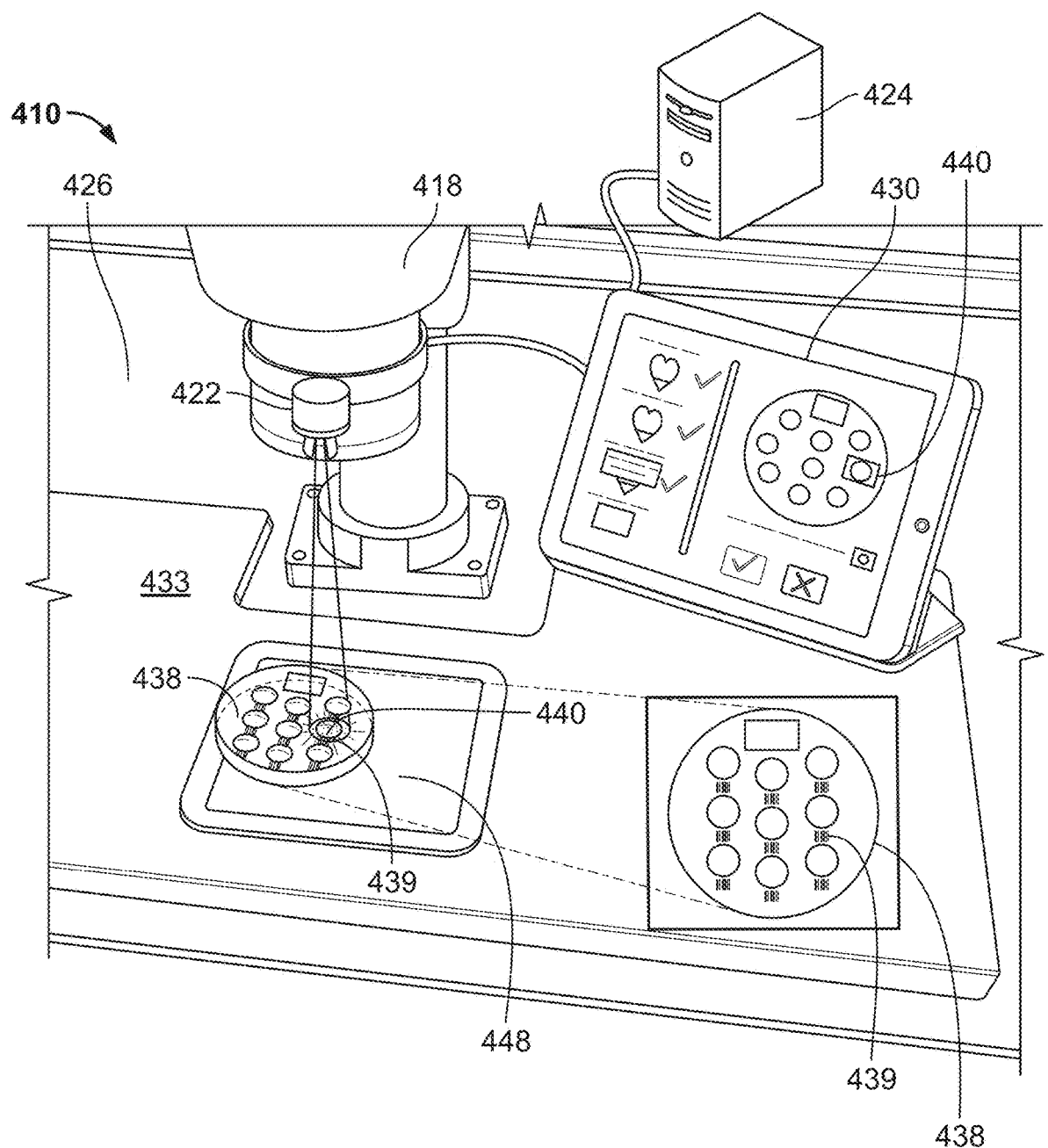
FIG. 14 is another system for tracking a biological material in an IVF process that is assembled in accordance with the teachings of the present disclosure.

Turning first to FIG. 14, an example assembly 410 for tracking a subject's biological material in a lab includes a microscope 418, an RFID or barcode reader 422 coupled to the microscope 418, a computer 424 coupled to the RFID tag or barcode reader 422, and a user interface 430 coupled to the computer 424. The RFID tag or barcode reader 422 is configured to read an RFID tag or barcode 439 on a dish 438 at a central location directly beneath the microscope 418. To ensure the right drop is being read, the embryologist would need to align the drop with cross hairs through the scope. In practice, after an embryologist moves the dish 438 to align a narrow field of the RFID tag or barcode reader 422 with a drop 440 on the dish 438, the RFID tag or barcode reader 422 reads the RFID tag or barcode 439 adjacent to the examined drop 440, processes the RFID tag or barcode 439 associated with the examined drop 440, and displays the dish 438 with the examined drop 440 highlighted on the user interface 430. The embryologist can input information (e.g., type of biological material) related to the examined drop 440 by directly using the user interface 430.

In the example of FIG. 14, the RFID or barcode reader 422 is attached to the lens of the microscope 418. However, in other examples, the RFID or barcode reader 422 could be mounted under the glass 448 that the dish 438 sits on. In yet another example, an RFID or barcode reader may be integrated with a camera of the microscope.

Figure 15:
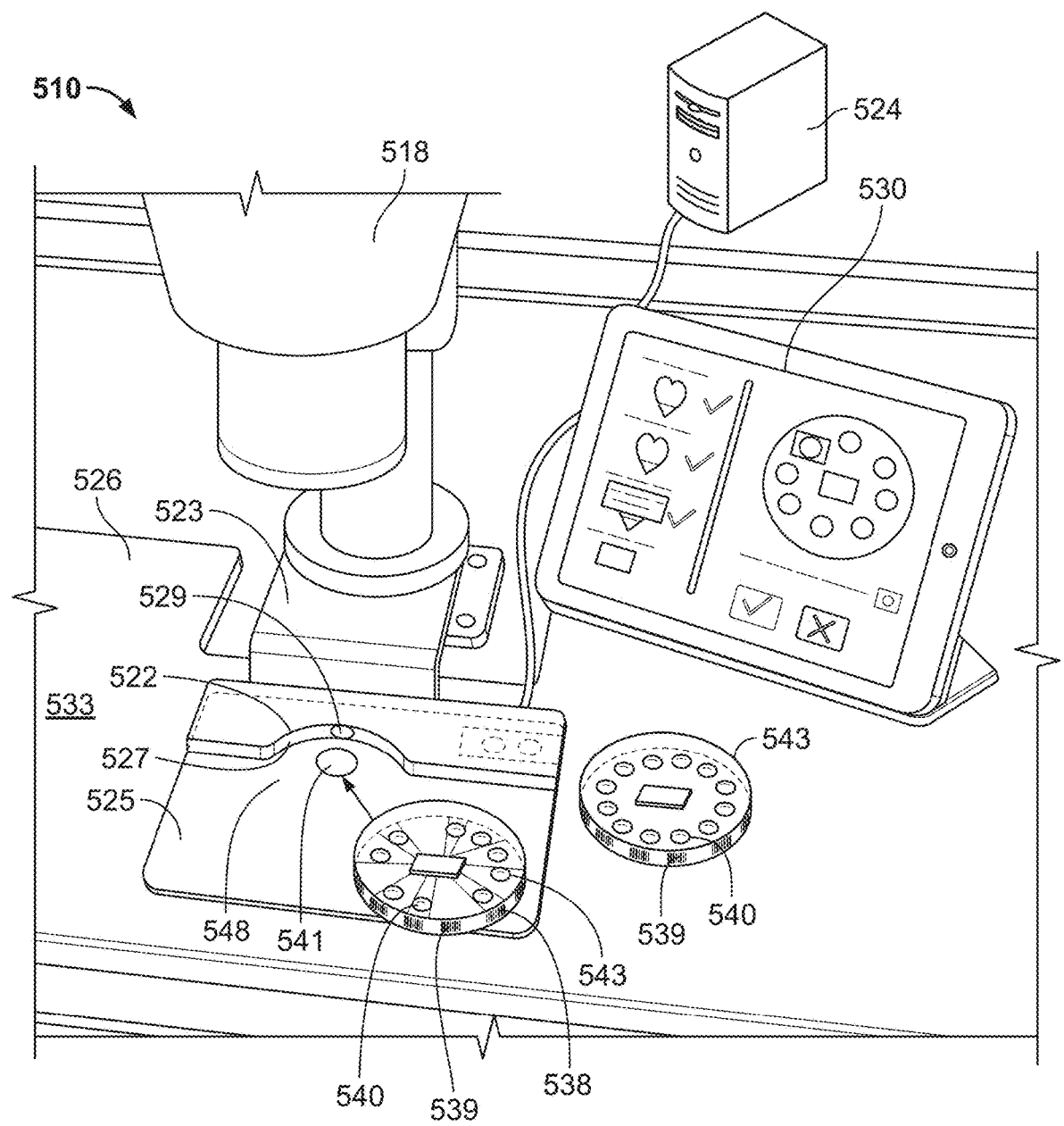
FIG. 15 is another system for tracking a biological material in an IVF process that is assembled in accordance with the teachings of the present disclosure.

In FIG. 15, another example assembly 510 for tracking a subject's biological material includes a microscope 518, a computer 524, a user interface 530 coupled to the computer 524, and a side-mounted RFID or barcode reader 522 coupled to the computer 524. The RFID or barcode reader 522 has an attachment arm 523, opaque working platform 525, and a ledge 527 with an integrated RFID or barcode scanner 529. The ledge 527 has a semi-circular cut-out that is shaped to receive a circular dish 538. In particular, the RFID or barcode reader 522 is configured to work with the dish 538 having a plurality of drops 540 disposed in a circular arrangement. A circumferential wall 543 of the dish is perpendicularly disposed relative to the dish surface and displays mounted RFID tags or barcodes 539 associated with each drop 540 on an exterior surface. In one example, the barcodes 539 can be same in each dish (e.g., molded in), and then the combination of RFID tag and the drop location provides a unique drop ID. When the wall 543 of the dish 528 is moved up against the ledge 527, an embryologist can rotate the dish 538 to align a particular drop 540 with a hole 541 in the working platform 525. The opaque working platform 525 blocks the light underneath the dish 538, and the hole 541 permits light to shine through to assist with aligning of the examined drop 540. The RFID or barcode scanner 529 scans an RFID tag or barcode 539 disposed on the external surface of the circumferential wall 543 of the dish 538, and sends information associated with the scanned RFID tag or barcode 539 to the computer 524. The drops 540 on the dish 538 are peripherally disposed such that the dish 438 need only be rotated against the ledge 527 to align the hole 541 with a different drop 540 and the scanner 529 with the RFID tag or barcode 539 of the different drop 540.

Figure 16:
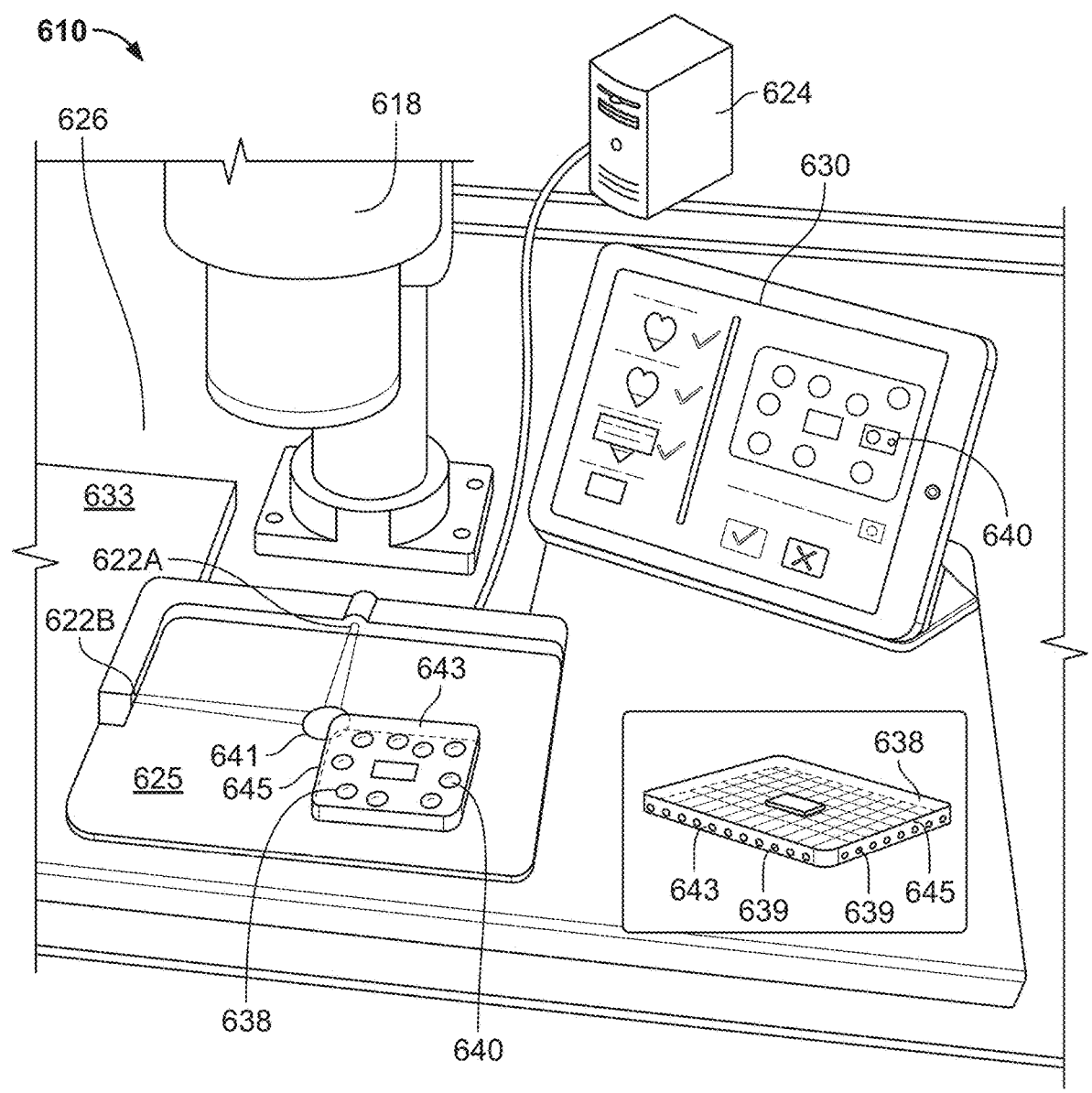
FIG. 16 is another system for tracking a biological material in an IVF process that is assembled in accordance with the teachings of the present disclosure.

FIG. 16 depicts another example assembly 610 for tracking a subject's biological material, and includes a microscope 618, a computer 624, a platform 625 with integrated first and second readers 622A, 622B and coupled to the computer 624, and a user interface 630 coupled to the computer 624. The first and second readers 622A, 622B are perpendicularly disposed relative to one another, barcode readers, or other character readers. The assembly 610 is configured to map multiple drops 640 on a rectangular dish 638 by scanning X, Y coordinate markers on the dish 638 corresponding with the drops 640. For example, the dish 638 includes X coordinate markings 639 on a first side 643, and Y coordinate markings of a second side 645 of the dish 638.

Initially, an embryologist will input into the user interface 630 the type of dish that will be examined under the microscope 618. After aligning a drop 640 with a central location denoted by a hole 641 formed in the opaque platform 625, the first reader 622A reads an X coordinate on the first side 643 of the dish 638 and the second reader 622B reads a Y coordinate on the second side 645 of the dish 638. The readers 622A, 622B send the scanned X, Y coordinates to the computer 624. The computer 624 then processes the data inputted by the embryologist and received from the readers 622A, 622B to map the drop 640 being examined on the dish 638, which then is displayed on the user interface 630

Figure 17:
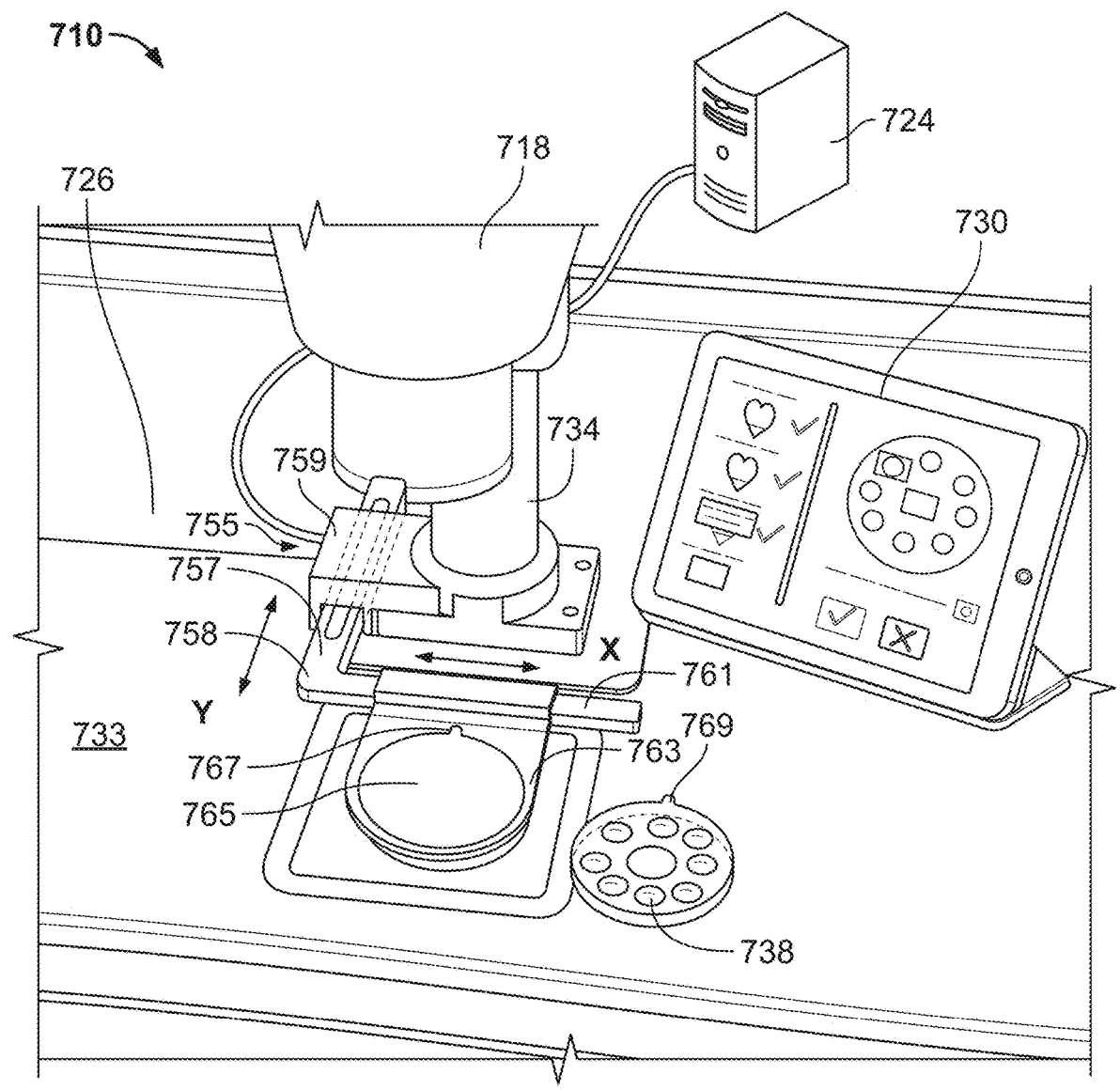
FIG. 17 is another system for tracking a biological material in an IVF process that is assembled in accordance with the teachings of the present disclosure.

In yet another example in FIG. 17, a biological material tracking assembly 710 includes a microscope 718, an X-Y coordinate bracket assembly 755, a computer 724, and a user interface 730 coupled to the computer 724. The X-Y coordinate bracket assembly 755 includes an L-shaped bracket 758 including a first arm 757 coupled to a base 734 of the microscope 718 via a coupler 759, and a second arm 761 coupled to the first arm 757 and perpendicularly disposed relative to the first arm 757. A movable frame 763 is coupled to the second arm 761 and includes an opening 765 sized and shaped to receive a dish 738. In particular, the frame 763 includes a notch 767 or other female locking component that releasably receives and couples to a protrusion 769 or other male locking component extending from a circumference of the dish 738.

Initially, an embryologist will input into the user interface 730 the type of dish that will be examined under the microscope 718. To ensure the right drop is being read, the embryologist aligns the drop with cross hairs through the microscope 718. Once the frame 763 receives the dish 738, the dish 738 can move by sliding the frame 763 in an X direction along the second arm 761 and sliding the bracket 758 in a Y direction relative to the coupler 759. The frame 763 is configured to move incrementally relative to location markers on the first and second arms 757, 761. Any movement in the X and Y directions is measured via one or more electronic measurement devices integrated into the L-shaped bracket 758 and/or coupler 759. When an examined drop is underneath the microscope 718, the electronic measurement devices integrated with the bracket assembly 755 sends the measured coordinates of the dish 738 to the computer 724. The computer 724 then processes the data inputted by the embryologist and received from the electronic measurement devices to map the location of the examined drop. The drop being examined under the microscope 718 and may be displayed on the user interface 730.

Figure 18:
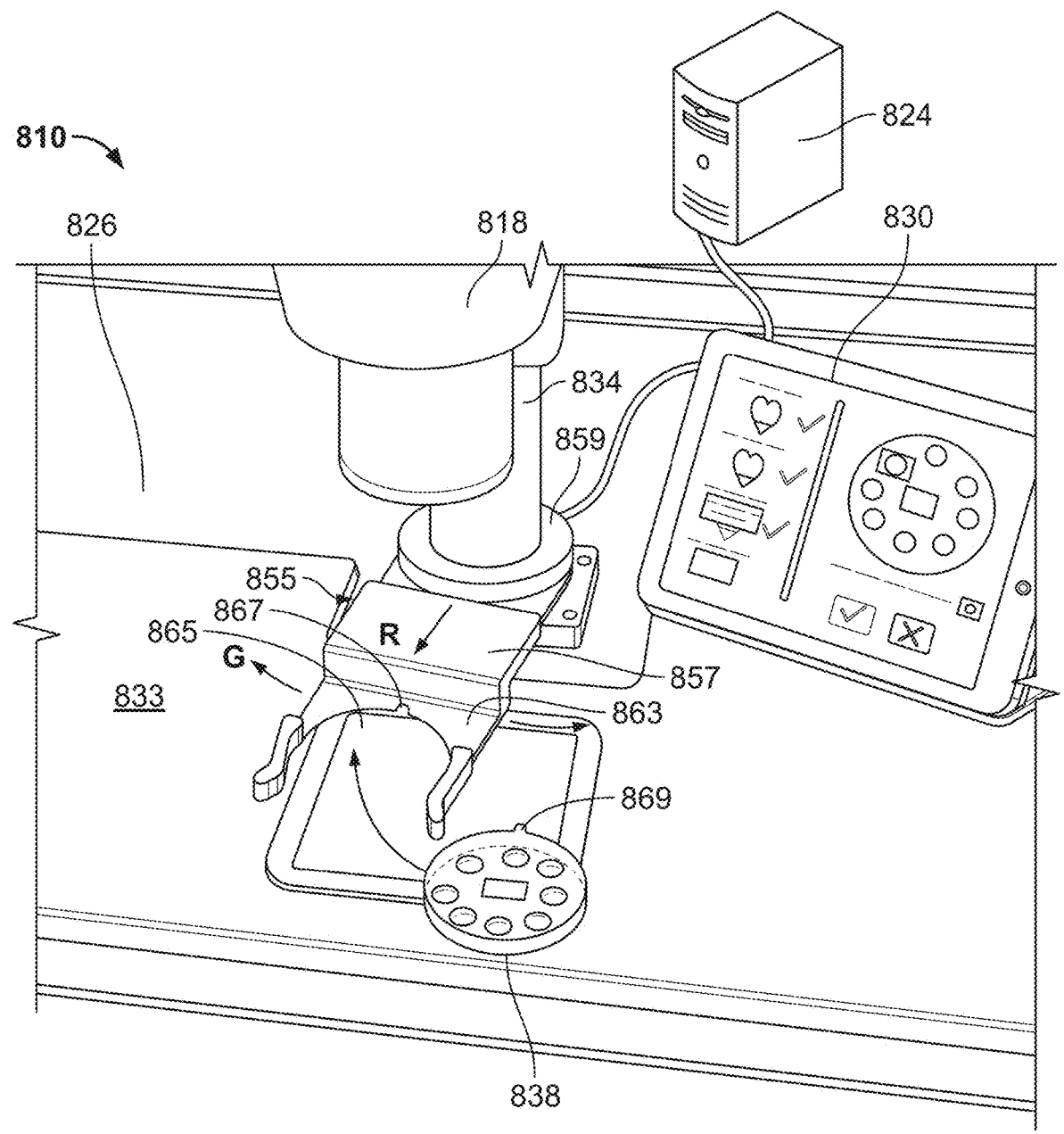
FIG. 18 is another system for tracking a biological material in an IVF process that is assembled in accordance with the teachings of the present disclosure.

Similar to the tracking assembly 710 of FIG. 17, a tracking assembly 810 of FIG. 18 includes a microscope 818, a coordinate bracket assembly 855 coupled to a base 834 of the microscope 818, a computer 824 coupled to the bracket assembly 855, and a user interface 830 coupled to the computer 824. However, unlike the coordinate bracket assembly 755 of FIG. 17, the coordinate bracket assembly 855 of FIG. 18 is configured to measure radial coordinates of the dish 838 to infer drop location on the dish 839. The bracket assembly 855 includes a frame 863 defining an opening 865 sized to receive the dish 838 and a notch 867 or other female locking component that releasably receives and couples to a protrusion 869, or other male locking component, that extends from a circumference of the dish 838. The bracket assembly 855 also includes a sliding arm 857 coupled to the frame 863, and a coupler 859 that couples the arm 857 to a base 834 of the microscope 818. An electronic measurement device is integrated into the coupler 859 to measure angular displacement of the frame 863 relative to the base 834 (i.e., movement in the G direction), and a different electronic measurement device is integrated into the arm 857 to measure radial displacement relative to the base 834 (i.e., movement in the R direction).

Initially, an embryologist will input into the user interface 830 the type of dish that will be examined under the microscope 818. Once the dish 838 is placed in the opening 865 of the frame 863, the dish 838 can move by swiveling the frame 863 relative to the coupler 859 and by sliding the frame 863 relative to the arm 857. When an examined drop is underneath the microscope 818 (aligned using a crosshairs through the microscope 818, for example), the electronic measurement devices send the angular and radial coordinates of the dish 838 to the computer 824. The computer 824 then processes the data inputted by the embryologist and received from the electronic measurement devices to map the location of the examined drop. The coordinates are mapped to the drops under the microscope 818 and displayed on the user interface 830.

In the examples of FIGS. 17 and 18, each respective dish 738, 838 includes a protrusion 769, 869 that couples to a corresponding notch 767, 867 or indentation of the frame 763, 863. However, in other examples, each respective dish 738, 838 may include a notch or indentation (or other female locking component) and the frame 763, 863 may include a protrusion (or other male locking component).

Figure 19:
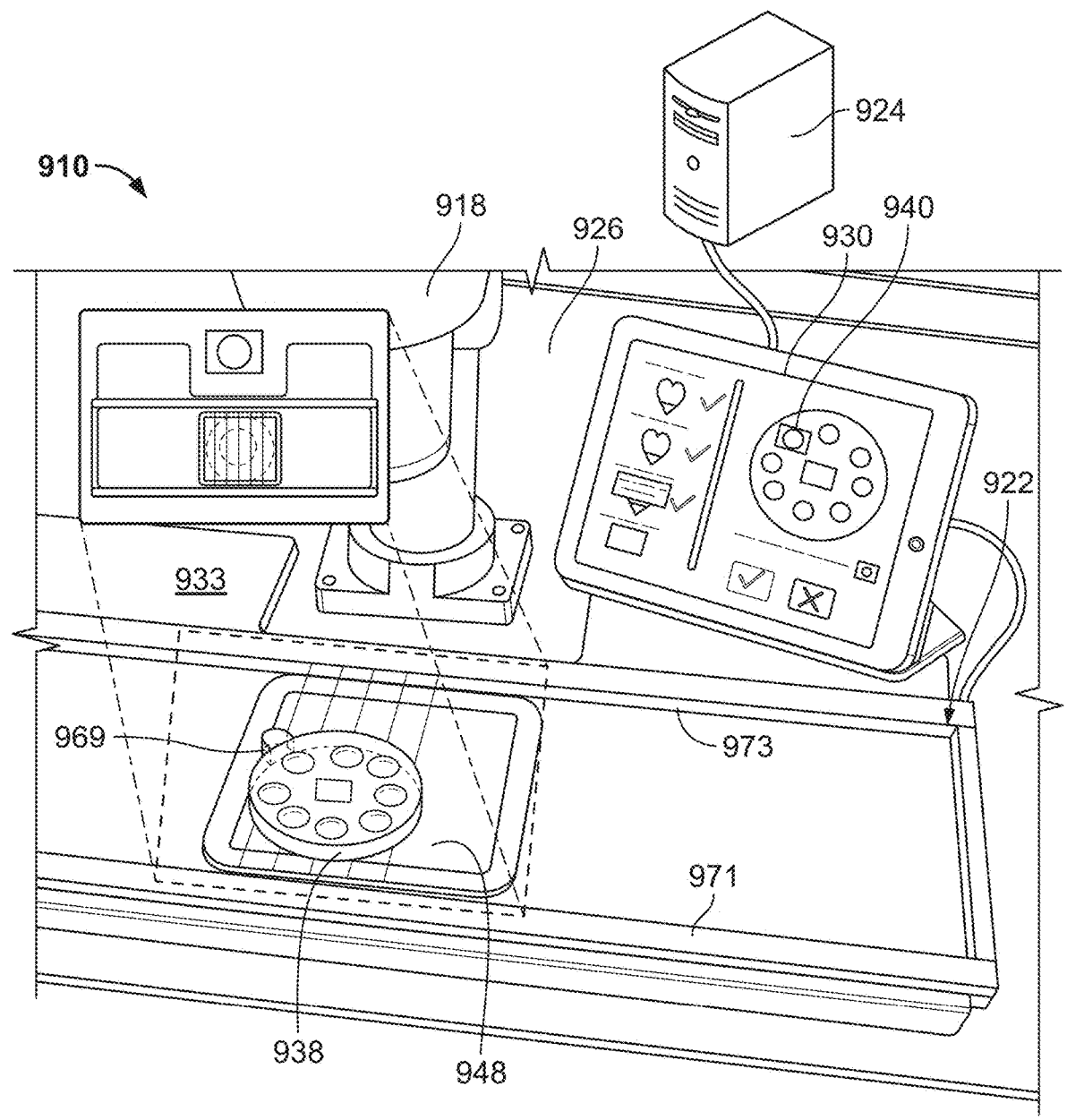
FIG. 19 is another system for tracking a biological material in an IVF process that is assembled in accordance with the teachings of the present disclosure.

In FIG. 19, a biological material tracking assembly 910 includes a microscope 918, an infrared (IR) detector, a computer 924 coupled to the IR detector 922, and a user interface 930 coupled to the computer 924. The IR detector 922 includes first and second horizontal sensors 971, 973 that emit IR light (i.e., an LED) and detect the light reflecting off of a scanned object. In particular, the IR detector 922 can detect an orientation of a known dish 938 by detecting a physical characteristic 969, such as a protrusion, of the dish 938. Initially, an embryologist will input into the user interface 930 the type of dish that will be examined under the microscope 918. To ensure the right drop is being read, the embryologist aligns the drop with cross hairs through the microscope 918. Once in place, the horizontal sensors 971, 973 scan the dish 938 on both sides of the protrusion 969 to determine the position and orientation of the dish 938. The sensors 971, 973 sends the data to the computer 924, which processes both the data inputted by the embryologist and received from the sensors 971, 973 to map the location of the examined drop on the dish 938 The computer 924 displays the dish 938 and the highlighted examined drop 940 on the user interface 930.

Figure 20:
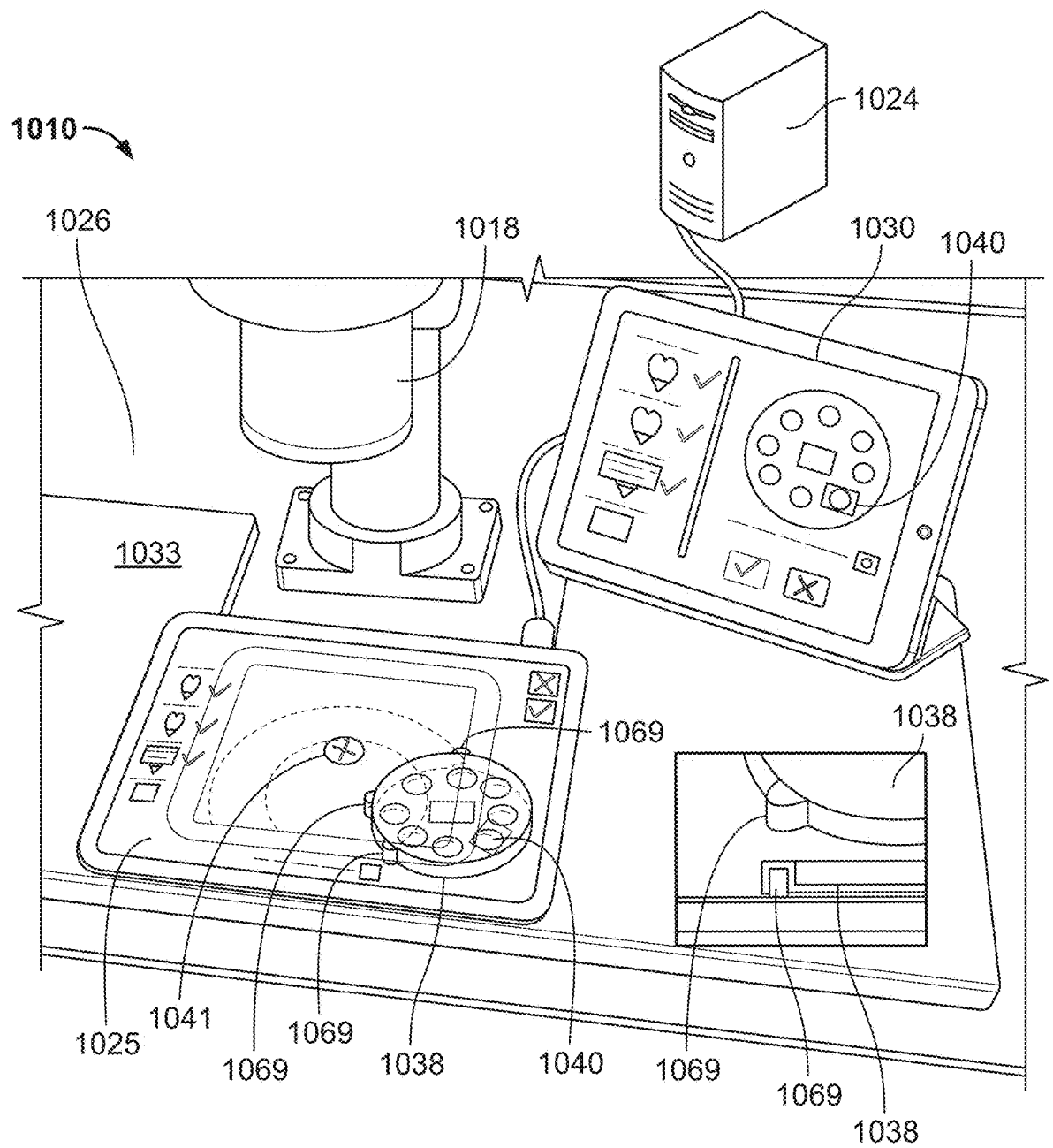
FIG. 20 is another system for tracking a biological material in an IVF process that is assembled in accordance with the teachings of the present disclosure.

In yet another example in FIG. 20, a tracking assembly 1010 includes a microscope 1018, a capacitive screen 1025 below the microscope 1018, a computer 1024, a user interface 1030 coupled to the computer 1024, and a compatible dish 1038. The dish 1038 includes three contacts 1069, each having a slight protrusion (as shown in magnified perspective and side views in FIG. 20) extending from a bottom surface of the dish 1038 that contacts the capacitive screen 1025 when the dish 1038 is placed on the capacitive screen 1025. To ensure the right drop is being read, the embryologist aligns the drop with cross hairs through the microscope 1018. The capacitive screen 1025 recognizes the contacts, and registers the contacts of the dish 1038 to identify the position and orientation of the dish 1038 relative to a central location 1041 of the microscope 1018. Specifically, computer 1024 processes the three contacts to infer the position and orientation of the dish 1038 relative to an examined drop 1040, and then displays the highlighted drop 1040 on the user interface 1030.

Figure 21:
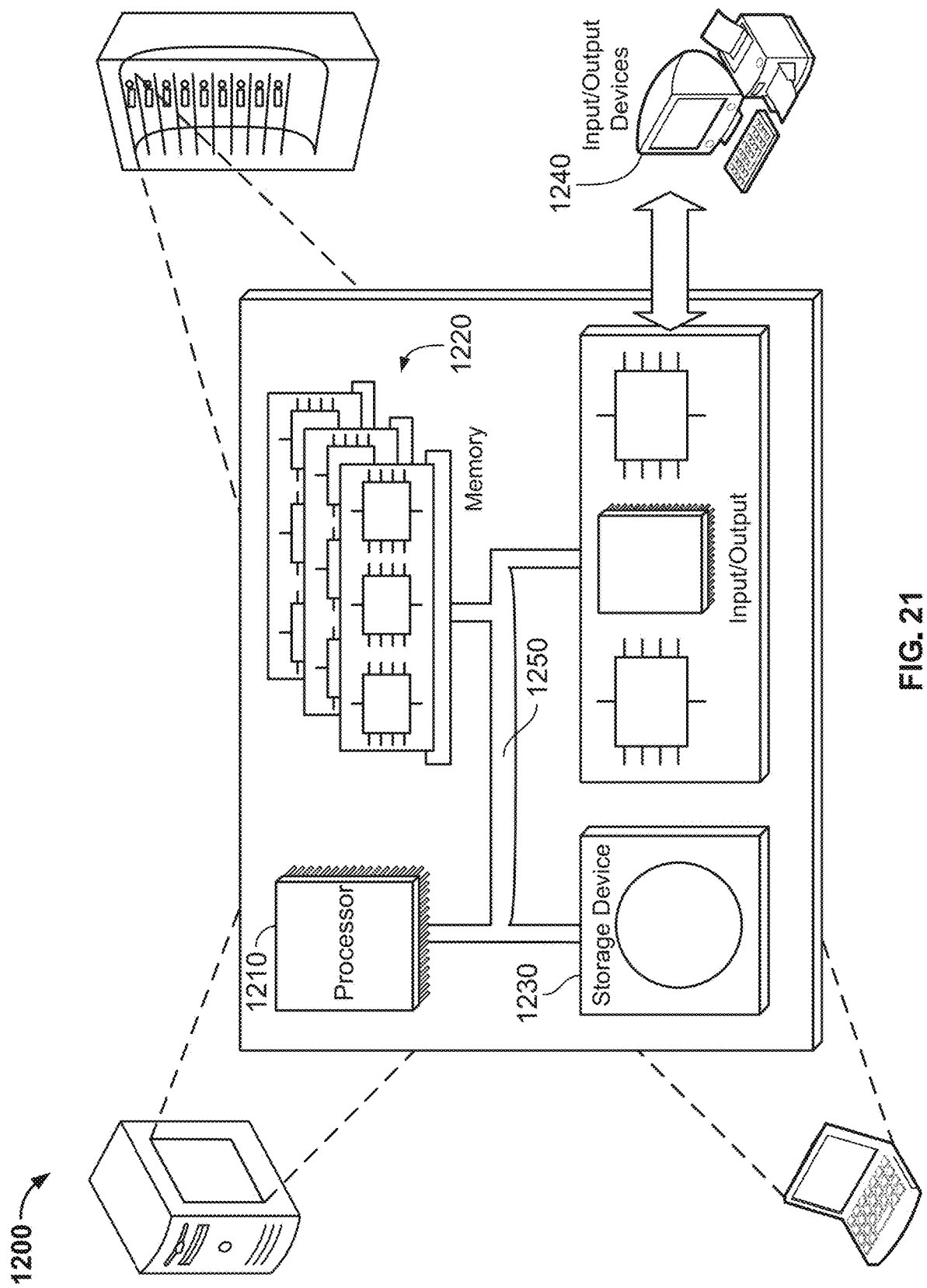
FIG. 21 is a block diagram of an example computing system.

FIG. 21 is block diagram of an example computer system 1200 that can be used to perform operations described above. The system 1200 includes a processor 1210, a memory 1220, a storage device 1230, and an input/output device 1240. Each of the components 1210, 1220, 1230, and 1240 can be interconnected, for example, using a system bus 1250. The processor 1210 is capable of processing instructions for execution within the system 1200. In one implementation, the processor 1210 is a single-threaded processor. In another implementation, the processor 1210 is a multi-threaded processor. The processor 1210 is capable of processing instructions stored in the memory 1220 or on the storage device 1230.

The memory 1220 stores information within the system 1200. In one implementation, the memory 1220 is a computer-readable medium. In one implementation, the memory 1220 is a volatile memory unit. In another implementation, the memory 1220 is a non-volatile memory unit.

The storage device 1230 is capable of providing mass storage for the system 1200. In one implementation, the storage device 1230 is a computer-readable medium. In various different implementations, the storage device 1230 can include, for example, a hard disk device, an optical disk device, a storage device that is shared over a network by multiple computing devices (e.g., a cloud storage device), or some other large capacity storage device.

The input/output device 1240 provides input/output operations for the system 1200. In one implementation, the input/output device 1240 can include one or more network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 1260. Other implementations, however, can also be used, such as mobile computing devices, mobile communication devices, set-top box television client devices, etc.

Although an example processing system has been described in FIG. 21, implementations of the subject matter and the functional operations described in this specification can be implemented in other types of digital electronic circuitry, or in computer software, firmware, or hardware, including the structures disclosed in this specification and their structural equivalents, or in combinations of one or more of them.

The tracking assemblies 10, 210, 310, 410, 510, 610, 710, 810, 910, 1010 of FIGS. 1A, 7, 11, and 14-20 may be integrated with a subject identification system that includes an RFID reader configured to read an RFID tag on each of the dishes that is placed on the work surface. The RFID reader 33 in FIG. 1A, for example, is a large platform integrated with, or placed on top of, a work bench. As a dish is put onto the work surface, the RFID reader 33 automatically reads the RFID tag disposed on a bottom of the dish. The RFID tag identifies the subject of the dish. In some examples, a second, smaller reader may be placed around the microscope light source 48 to read the tag under the microscope 18, as opposed to each dish on the RFID reader 33. In another example, the RFID reader 33 may be divided into various zones to identify the dish relative to the various zones of the work surface 26.

The imaging systems 14, 214, 314 described above with respect to FIGS. 1A, 1B, 7, and 11 operate on a computer 24, 224, 324 and each includes one or more cameras, a memory 52, and detection model 56. However, in another example, the imaging system may have more or fewer components. In another example, the memory and or detection model of the imaging system may be integrated with one or more cameras, the microscope, the user interface, or the cloud instead of the local computer 24, 224, 324.

In the assembly 10 of FIG. 1A and the microscope 318 of FIG. 11, the wide FOV cameras 22, 322 are mounted to the bodies 34, 334 of the microscopes 18, 318, respectively. However, in other examples, the cameras 22, 322 may not be directly mounted to the microscope, and may instead be coupled to a different mount or positioned on the work surface 26, 326.

The IVF cycle 100 of FIG. 2 is an example process, and may include more or fewer stages. For example, the IVF cycle 100 was described tracking a single embryo 116A and the biopsy taken from the embryo 116A. However, in some examples, the imaging system may be configured to track multiple embryos processed at a time.

While the dish in FIGS. 3-5 includes a line as the characteristic, other example dishes for use with a wide field of view camera may include other visual characteristics such as, for example, dots, symbols, letters, numbers, and shapes created by painting, printing, etching, molding, labeling, or otherwise marking the dish directly.

In the illustrated example, the second stage of the IVF cycle depicts multiple embryos disposed in two drops on a culture dish. However, in other examples, the second stage of the IVF cycle includes a time lapse incubator. In this example, the third stage III involves transferring the embryos form the time lapse incubator to a holding dish, as shown in FIG. 2.

In some examples, the biopsy dish 142 may contain more than one drop, and each drop may contain an embryo and associated biopsy. Similarly, the wash and pre-vitrification dishes 150, 166 may be configured to contain drops for multiple biopsies and/or embryos.

In some examples, the imaging systems 14, 214, 314 may be configured to measure time that the embryo and/or biopsy resides in a particular drop. For example, at the sixth stage VI of the process 100 illustrated in FIG. 2, the system 14, 214, 314 may recognize when the biopsy is delivered to each wash drop and initiate a timer for a set period of time the biopsy should spend in each wash drop.

At the seventh stage VII of the process 100 illustrated in FIG. 2, the PCR tube is pre-labeled with a unique patient identifier. However, in other examples, the system may be configured to print a unique patient identifier when an empty PCR tube is scanned at the seventh stage. The embryologist places the biopsy in the tube immediately before or after printing and securing the label to the PCR tube to ensure accuracy. In other examples, the PCR tube may have an unassigned unique identifier attached which becomes associated with the biopsy once the biopsy is placed in the tube.

In some examples, the imaging systems 14, 214, 314 may provide a digital, visual guidance to provide feedback during the IVF process. In one example, a transparent LCD screen may be disposed under the dish, which could provide visual feedback and guidance to the embryologist while the embryologist is viewing the dish under the microscope. In another example, the imaging system 14 may include a microscope with an integrated graphical overlay that provides feedback and guidance while viewing the dish through the microscope. Specifically, graphical overlay may incorporate augmented reality (AR) technology. For example, the microscopes 18, 218, 318 may incorporate AR by providing a transparent screen disposed between an embryologist's eye and what is being read with the microscope. The AR technology may be coupled with the imaging systems 14, 214, 314 to give visual commands to the embryologist (e.g., highlighting a drop on the examined dish to identify where the drop should be deposited, crossing out drops that already contain biological material, crossing out entire dishes to indicate the incorrect dish is under the microscope, etc.). In another example, the embryologist could use a microscope configured with a display screen instead of eyepieces. In this case, graphical information could be overlaid onto that display screen.

In some example assemblies for tracking a subject's biological material in a lab during an IVF process, the imaging systems 14, 214, 314 may be replaced or combined with other components for inferring a position and orientation of the dish being examined. In some examples, the assembly, or specifically the microscope, may have components or features that can identify a central location so that the embryologist can identify a spot that is directly under the microscope. For example, the microscope may have a cross hair or other marker in the optical eyepiece or on the glass underneath the dish to denote a central location. The assembly may include components to block light underneath the dish except for the central location, or components that provide a colored light or laser at the center of the dish.

In some examples, the visual characteristics may include dish details, information added to the dish, information around the drops, and/or layout of different visual references relative to each other. For example, a dish may have an RFID tag on a bottom surface, and is specifically placed adjacent to a first drop location. The drops on the dish may be identified by their relative locations to the RFID tag.

The tracking assemblies 10, 210, 310, 410, 510, 610, 710, 810, 910, 1010 of FIGS. 1A, 7, 11, and 14-20 may be used to track biological material outside of the IVF process. Further, while the imaging systems 14, 214, 314 described herein are used in an IVF process to track embryos and biopsies in an IVF lab, the imaging systems may be used to track different biological material in different processes. In such examples, a different technician may be working in the lab and interacting with the imaging system.

While the imaging systems 14, 214, 314 described above rely on images obtained from a camera mounted externally to the microscope, to a microscope camera of the microscope, or both types of cameras, in other embodiments, an imaging system may include additional multiple cameras set up through the lab space to track multiple dishes. For example, a plurality of spaced apart cameras are perpendicularly disposed relative to the horizontal work surface to image all dishes, for example, under a lab hood.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, or a Jax framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any disclosure or of what may be claimed, but rather as descriptions of features that may be specific to particular examples of particular disclosures. Certain features that are described in this specification in the context of separate examples can also be implemented in combination in a single example. Conversely, various features that are described in the context of a single example can also be implemented in multiple examples separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the examples described herein should not be understood as requiring such separation in all examples, and it should be understood that the described program components and systems can generally be integrated together in a single product or packaged into multiple products.

Particular examples of the subject matter have been described. Other examples are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more computers for tracking a biological material of a subject during an in-vitro fertilization process, the method comprising:
   receiving, from a camera, an image of a dish having a visual characteristic and a drop disposed on the dish, the dish holding the biological material at a drop location;
   processing the image of the dish, using a drop identification model, to identify the drop according to the visual characteristic;
   assigning an identifier to the drop associated with the drop location;
   recording the identifier of the drop associated with the drop location; and
   processing the image of the dish having a drop pattern, using a drop pattern identification model, to classify a type of dish associated with the drop pattern.

2. The method of claim 1, wherein the receiving comprises receiving a partial or entire layout image of the dish using a microscope camera.

3. The method of claim 1, wherein the receiving comprises receiving an entire layout of the dish using a wide-view camera.

4. The method of claim 1, comprising identifying a first status or condition of a pipette at the drop location, wherein the pipette receives the biological material at the drop location; and
   recording in a memory the first status or condition of the pipette holding the biological material.

5. The method of claim 4, wherein the identifying the first status or condition comprises determining that the pipette enters a first drop holding the biological material.

6. The method of claim 4, comprising identifying a second status or condition of the pipette holding the biological material at a second location.

7. The method of claim 6, comprising analyzing the second status or condition of the pipette.

8. The method of claim 7, comprising determining, before the biological material is delivered to the second location, that the second location for depositing the biological material correlates with a standard operating protocols stored in a database of the memory.

9. The method of claim 8, comprising signaling an error message after determining that the second location does not correlate with standard operating protocols.

10. The method of claim 8, comprising signaling a correct message after determining that the second location correlates with standard operating protocols.

11. The method of claim 6, comprising recording a delivery status of the biological material from the pipette to the second location, wherein the second location is a tube having a unique identity.

12. The method of claim 6, comprising recording a delivery status of the biological material from the pipette to the second location, wherein the second location is a drop of washing solution.

13. The method of claim 6, comprising recording a delivery status of the biological material from the pipette to the second location, wherein the second location is a drop on a second dish.

14. The method of claim 6, comprising identifying a third status or condition of the pipette holding the biological material at a third location.

15. The method of claim 1, comprising assigning the biological material a unique identity, wherein the unique identity of the biological material is maintained as the biological material moves.

16. The method of claim 15, wherein the identifying the biological material comprises identifying that the biological material is an embryo associated with the drop location.

17. The method of claim 15, wherein the identifying the biological material comprises identifying that the biological material is a biopsy of an embryo associated with the drop location.

18. The method of claim 1, comprising processing the image of the dish, using a subject identification model, to classify a subject identification associated with the dish, and recording in the memory the subject identification associated with the dish.

19. The method of claim 1, comprising:
obtaining, from a database, a pattern of drops on the dish; and
processing a model input that comprises the pattern of drops on the dish using a machine learning model, having a set of machine learning model parameters, to generate a model output that characterizes a likelihood that the pattern of drops on the dish is associated with a type of dish;
classifying, based on the model output of the machine learning model, whether the pattern of drops is associated with the type of dish.

20. The method of claim 19, comprising training the machine learning model, by a machine learning training technique, to determine trained values of the set of machine learning model parameters.

21. The method of claim 20, wherein training the machine learning model by the machine learning training technique comprises:
obtaining a set of training examples, wherein each training example comprises:
(i) a training input comprising a pattern of drops on a dish, and (ii) a target output based on whether the pattern of drops designates the type of dish; and
training the machine learning model on the set of training examples.

22. The method of claim 21, wherein training the machine learning model on the set of training examples comprises training the machine learning model to, for each training example, process the training input of the training example to generate a model output that matches the target output of the training example.

23. One or more non-transitory computer storage media storing:
instructions that when executed by one or more computers cause the one or more computers to perform operations for tracking a biological material in an in-vitro fertilization (IVF) process, the operations comprising:
receiving an image of a dish, wherein the dish comprises a visual characteristic, one or more drops, and the biological material at a drop location;
processing the image of the dish, using a drop identification model, to identify a drop according to the visual characteristic;
assigning an identifier to the drop based on the visual characteristic;
recording the identifier of the drop associated with the drop location;
receiving an image of a second dish having a visual characteristic and one or more drops;
processing the image of the second dish, using a drop identification model, to identify a drop associated with a drop location of the second dish according to the visual characteristic;
assigning an identifier to the drop based on the visual characteristic; and
recording the identifier of the drop associated with the drop location of the second dish.

24. The non-transitory computer storage media of claim 23, comprising a database containing information related to a plurality of dish types and a plurality of drop patterns for each of the plurality of the types of dishes; wherein the operations comprise:
receiving an image of a dish having a drop pattern;
comparing the drop pattern to the plurality of drop patterns associated with the plurality of types of dishes stored in the database; and
identifying a dish type of the dish according to the drop pattern.

25. The non-transitory computer storage media of claim 23, wherein the operations comprise:
receiving an image of a pipette adjacent to or in the drop; and
identifying a status or condition of the pipette as receiving the biological material associated with the drop.

26. The non-transitory computer storage media of claim 25, wherein the operations comprise:
receiving an image of a pipette adjacent to or in a different drop at a drop location of a second dish; and
identifying a status or condition of the pipette before delivering the biological material associated with the drop location of the dish to the drop location of the second dish.

27. The non-transitory computer storage media of claim 25, wherein the operations comprise:
receiving an image of the pipette adjacent to or in a tube; and
identifying a status or condition of the pipette before delivering the biological material associated with the drop location to the tube.

28. The non-transitory computer storage media of claim 25, wherein the operations comprise, before delivering the biological material, determining that the status or condition of the pipette correlates with a correct drop location according to standard operating protocols stored in a database.

29. The non-transitory computer storage media of claim 28, wherein the operations comprise, before delivering the biological material, delivering a correct message after determining the status or condition of the pipette correlates with the correct drop location.

30. The non-transitory computer storage media of claim 28, wherein the operations comprise, before delivering the biological material, delivering an error message after determining the status or condition of the pipette does not correlate with the correct drop location.

31. The non-transitory computer storage media of claim 25, wherein the operations comprise:
receiving an image of the pipette adjacent to or in a second drop of the dish; and
identifying a status or condition of the pipette before delivering the biological material associated with the drop location to the second drop of the dish.

32. The non-transitory computer storage media of claim 31, wherein the operations comprise:
receiving an image of the pipette entering a drop located at the drop location;
identifying a status or condition of the pipette entering the drop as receiving the biological material associated with the drop location,
receiving an image of the pipette entering a different drop located at a different drop location; and
identifying a status or condition of the pipette entering the different drop as delivering the biological material associated with the drop location to the second drop location.

33. The non-transitory computer storage media of claim 23, wherein the operations comprise processing the image of the dish, using a dish identification model, to classify a dish orientation or dish type according to the visual characteristic.

34. The non-transitory computer storage media of claim 23, wherein the operations comprise assigning the biological material a unique identity, wherein the unique identity of the biological material is maintained as the biological material moves.

35. A system for tracking a biological material in an in-vitro fertilization (IVF) process, the system comprising:
a microscope;
a camera;
one or more computers; and
one or more storage devices communicatively coupled to the one or more computers, wherein the one or more storage devices store:
a database containing a plurality of visual characteristics;
instructions that, when executed by the one or more computers, cause the one or more computers to perform operations for tracking a biological material in an in-vitro fertilization process, the operations comprising:
receiving an image of a dish, wherein the dish comprises a visual characteristic, one or more drops, and the biological material at a drop location;
processing the image of the dish to identify a drop according to the visual characteristic and/or the one or more drops;
assigning an identifier to the drop associated with the drop location;
recording the identifier of the drop associated with the drop location;
receiving an image of a second dish having a visual characteristic and one or more drops;
processing the image of the second dish, using a drop identification model, to identify a drop associated with a drop location of the second dish according to the visual characteristic;
assigning an identifier to the drop based on the visual characteristic; and
recording the identifier of the drop associated with the drop location of the second dish.

36. The system of claim 23, wherein the camera is a microscope camera configured to image the dish.

37. The system of claim 23, wherein the camera is a wide-view camera configured to image an entire layout of the dish.

38. A method performed by one or more computers for tracking a biological material of a subject during an in-vitro fertilization process, the method comprising:
receiving, from a camera, an image of a dish having a visual characteristic and a drop disposed on the dish, the dish holding the biological material at a drop location;
processing the image of the dish, using a drop identification model, to identify the drop according to the visual characteristic;
assigning an identifier to the drop associated with the drop location;
recording the identifier of the drop associated with the drop location;
identifying a first status or condition of a pipette at the drop location, wherein the pipette receives the biological material at the drop location; and
recording in a memory the first status or condition of the pipette holding the biological material;
identifying a second status or condition of the pipette holding the biological material at a second location;
analyzing the second status or condition of the pipette;
determining, before the biological material is delivered to the second location, that the second location for depositing the biological material correlates with a standard operating protocols stored in a database of the memory; and
signaling (i) an error message after determining that the second location does not correlate with standard operating protocols or (ii) a correct message after determining that the second location correlates with standard operating protocols.

39. The method of claim 38, comprising:
receiving an image of a second dish having a visual characteristic and one or more drops;
processing the image of the second dish, using a drop identification model, to identify a drop associated with a drop location of the second dish according to the visual characteristic;
assigning an identifier to the drop based on the visual characteristic; and
recording the identifier of the drop associated with the drop location of the second dish.

40. The method of claim 38, comprising assigning the biological material a unique identity, wherein the unique identity of the biological material is maintained as the biological material moves.

41. The method of claim 40, wherein the identifying the biological material comprises identifying that the biological material is an embryo associated with the drop location.

42. The method of claim 38, comprising processing the image of the dish having a drop pattern, using a drop pattern identification model, to classify a type of dish associated with the drop pattern.

* * * * *